(12) United States Patent
Nakamura

(10) Patent No.: US 11,245,647 B2
(45) Date of Patent: Feb. 8, 2022

(54) INFORMATION PROCESSING APPARATUS AND INFORMATION PROCESSING METHOD

(71) Applicant: Kazuaki Nakamura, Kanagawa (JP)

(72) Inventor: Kazuaki Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/583,615

(22) Filed: Sep. 26, 2019

(65) Prior Publication Data
US 2020/0106723 A1 Apr. 2, 2020

(30) Foreign Application Priority Data

Sep. 28, 2018 (JP) .............................. JP2018-186051

(51) Int. Cl.
*H04L 12/58* (2006.01)
(52) U.S. Cl.
CPC .............. *H04L 51/02* (2013.01); *H04L 51/16* (2013.01)
(58) Field of Classification Search
CPC ................................ H04L 51/02; H04L 51/16
USPC .................................................. 709/205, 206
See application file for complete search history.

(56) References Cited

U.S. PATENT DOCUMENTS

| 7,231,343 B1 * | 6/2007 | Treadgold ............. | G06F 40/247 704/9 |
| 2002/0026435 A1 * | 2/2002 | Wyss ................... | G06Q 10/107 |
| 2006/0203980 A1 * | 9/2006 | Starkie ..................... | G06F 8/30 379/88.18 |
| 2007/0287471 A1 * | 12/2007 | Wood .................... | H04L 63/107 455/456.1 |

(Continued)

FOREIGN PATENT DOCUMENTS

| JP | 2018-092585 | 6/2018 |
| JP | 2018-128843 | 8/2018 |

OTHER PUBLICATIONS

Extended European Search Report for 19199958.0 dated Feb. 4, 2020.

*Primary Examiner* — Kevin T Bates
*Assistant Examiner* — Chen-Liang Huang
(74) *Attorney, Agent, or Firm* — IPUSA, PLLC

(57) ABSTRACT

An information processing apparatus communicable with a first terminal device is configured to transmit a message in response to receiving an inquiry. The information processing apparatus includes: reference information referenced when responding to the inquiry received from the first terminal device, which includes at least one set of a question item and a response corresponding to the question item; and history information including inquiries received from the first terminal device and messages that are transmitted or received with respect to the received inquiries. The information processing apparatus opens a first screen displaying infor- (Continued)

mation in the history information, receives an operation of selecting change target information from the information displayed on the first screen, opens a second screen for updating the reference information corresponding to the selected change target information, and receives an updating operation for updating the reference information corresponding to the selected change target information through the second screen.

17 Claims, 27 Drawing Sheets

(56) References Cited

U.S. PATENT DOCUMENTS

| | | | |
|---|---|---|---|
| 2014/0195492 A1* | 7/2014 | Wilding | G06F 16/215 707/684 |
| 2014/0337765 A1* | 11/2014 | Jain | H04L 65/1093 715/753 |
| 2016/0294570 A1 | 10/2016 | Ahi | |
| 2018/0158085 A1* | 6/2018 | Wohlwend | H04W 4/12 |
| 2018/0159806 A1 | 6/2018 | Endo et al. | |
| 2018/0227251 A1 | 8/2018 | Takishima et al. | |
| 2019/0272769 A1* | 9/2019 | Yasuoka | G09B 7/04 |

* cited by examiner

FIG.8

CATEGORY DB

| ID | CATEGORY NAME | UPDATED DATE/TIME |
|---|---|---|
| 0-1 | MOVING-IN | 2017-07-11T07:07 |
| 0-2 | MOVING-OUT | 2017-07-11T07:10 |
| 0-3 | AUSPICIOUS EVENT | 2018-02-07T16:40 |
| 0-4 | FUNERAL | 2018-02-07T16:55 |
| 0-5 | INSURANCE | 2017-03-14T10:30 |
| 0-6 | UNION | 2018-03-08T09:30 |
| 0-7 | DELIVERY DATE | 2018-06-12T14:20 |
| ..... | ..... | ..... |

| ID | QUESTION | SIMILAR QUESTION | ANSWER | CATEGORY ID | UPDATED DATE/TIME |
|---|---|---|---|---|---|
| ... | ... | ... | ... | ... | ... |
| 1-11 | List of necessary procedures when having a baby | — | When an employee or a spouse of an employee has given birth, the following applications are required: 1. Notification of change of family structure (Mandatory) 2. Application for congratulatory money for childbirth 3. (Health Insurance) Notification of change of dependents 4. (Health Insurance) Application for payment of maternity benefit 5. Application for stopping payment of commuting allowance | 0-03 | 2018-02-07T16:22 |
| 1-12 | Application for congratulatory money for childbirth | — | When an employee or a spouse of an employee has given birth, congratulatory money for childbirth and part of expense for childbirth are paid, and maternity leave is granted. | 0-03 | 2018-02-07T16:40 |
| ... | ... | ... | ... | ... | ... |
| 1-33 | How to use easy delivery date estimator | | Please select or input category of article to be ordered. | 0-07 | 2018-06-12T14:20 |
| ... | ... | ... | ... | ... | ... |

FIG.10

INQUIRY HISTORY DB

| ID | SESSION ID | CATEGORY ID ASSOCIATED WITH HIT QUESTION | QUESTION ID OF HIT QUESTION | USER INPUT | FEEDBACK | DATE/TIME |
|---|---|---|---|---|---|---|
| 3-1 | zeta/Guest/aaa⋯.bbbb | 0-05 | 1-55 | I want to know types of insurance | YES | 2018-04-11T10:15 |
| 3-2 | zeta/Guest/36c2a9cc-6258-4276-ab0d-d2b739ac65a3 | 0-03 | 1-11 | Things needed to do when you have a baby | YES | 2018-03-30T14:01 |
| 3-3 | zeta/Guest/36c2a9cc-6258-4276-ab0d-d2b739ac65a3 | 0-03 | 1-12 | Application for congratulatory money for childbirth | NO | 2018-03-30T14:15 |
| 3-4 | zeta/Guest/xxx⋯.yyy⋯.zzz | 0-05 | 1-56 | How to buy insurance | NO | ⋯ |
| 3-5 | zeta/Guest/xxx⋯.yyy⋯.zzz | 0-05 | 1-57 | How to buy life insurance | YES | ⋯ |
| 3-6 | zeta/Guest/xxx⋯.yyy⋯.zzz | 0-05 | 1-58 | I want to know how to cancel insurance | YES | ⋯ |
| ⋯ | ⋯ | ⋯ | ⋯ | ⋯ | ⋯ | ⋯ |

FIG.11

| ID | SESSION ID | SENDER 0: ADMIN-ISTRATOR 1: USER | CONTENT OF STATEMENT | STATEMENT TYPE ID 5-0: CATEGORY 5-1: Q&A 5-2: SCENARIO | CONTENT ID | DATE/TIME |
|---|---|---|---|---|---|---|
| 4-1 | zeta/Guest/36c2a9cc-6258-4276-ab0d-d2b739ac65a3 | 0 | Do you have any question? Please enter your question directly, or please select a search option using buttons. | 5-2 | 6-1 | 2018-03-30 T14:01:29.3 |
| 4-2 | zeta/Guest/36c2a9cc-6258-4276-ab0d-d2b739ac65a3 | 1 | Things needed to do when you have a baby | — | — | 2018-03-30 T14:03:31.1 |
| 4-3 | zeta/Guest/36c2a9cc-6258-4276-ab0d-d2b739ac65a3 | 0 | Here is the answer for "list of necessary procedures when having a baby". When an employee or a spouse of an employee has given birth, the following applications are required: 1. Notification of change of family structure (Mandatory) 2. Application for congratulatory money for childbirth 3. (Health Insurance) Notification of change of dependents 4. (Health Insurance) Application for payment of maternity benefit 5. Application for stopping payment of commuting allowance | 5-1 | 1-11 | 2018-03-30 T14:03:31.7 |
| 4-4 | zeta/Guest/36c2a9cc-6258-4276-ab0d-d2b739ac65a3 | 0 | Does this answer solve your question? Press YES or NO to exit. | 5-2 | 6-3 | 2018-03-30 T14:03:32.4 |
| 4-5 | zeta/Guest/36c2a9cc-6258-4276-ab0d-d2b739ac65a3 | 1 | YES | 5-2 | 6-4 | 2018-03-30 T14:03:35.6 |
| 4-6 | zeta/Guest/36c2a9cc-6258-4276-ab0d-d2b739ac65a3 | 0 | Thank you for visiting us. | 5-2 | 6-6 | 2018-03-30 T14:03:36.3 |
| 4-7 | zeta/Guest/36c2a9cc-6258-4276-ab0d-d2b739ac65a3 | 0 | Do you have any question? Please enter your question directly, or please select a search option using buttons. | 5-2 | 6-1 | 2018-03-30 T14:03:38.3 |
| 4-8 | zeta/Guest/36c2a9cc-6258-4276-ab0d-d2b739ac65a3 | 1 | Application for congratulatory money for childbirth | — | — | 2018-03-30 T14:06:53.1 |
| 4-9 | zeta/Guest/36c2a9cc-6258-4276-ab0d-d2b739ac65a3 | 0 | Several candidates are found. Is there an answer you are looking for? List of necessary procedures when having a baby Congratulatory money for childbirth No desired answer is found | 5-1 | 1-13 | 2018-03-30 T14:06:53.8 |
| 4-10 | zeta/Guest/36c2a9cc-6258-4276-ab0d-d2b739ac65a3 | 1 | Congratulatory money for childbirth | — | — | 2018-03-30 T14:08:56.5 |
| 4-11 | zeta/Guest/36c2a9cc-6258-4276-ab0d-d2b739ac65a3 | 0 | When an employee or a spouse of an employee has given birth, congratulatory money for childbirth and part of expense for childbirth are paid, and maternity leave is granted. | 5-1 | 1-12 | 2018-03-30 T14:08:56.9 |
| 4-12 | zeta/Guest/36c2a9cc-6258-4276-ab0d-d2b739ac65a3 | 0 | Does this answer solve your question? Press YES or NO to exit. | 5-2 | 6-3 | 2018-03-30 T14:08:57.4 |
| 4-13 | zeta/Guest/36c2a9cc-6258-4276-ab0d-d2b739ac65a3 | 1 | NO | 5-2 | 6-5 | 2018-03-30 T14:09:32.5 |
| 4-14 | zeta/Guest/36c2a9cc-6258-4276-ab0d-d2b739ac65a3 | 0 | I apologize for inconvenience, but please contact customer service, or please try to ask again by changing a keyword or an option to be selected. | 5-2 | 6-7 | 2018-03-30 T14:09:32.9 |

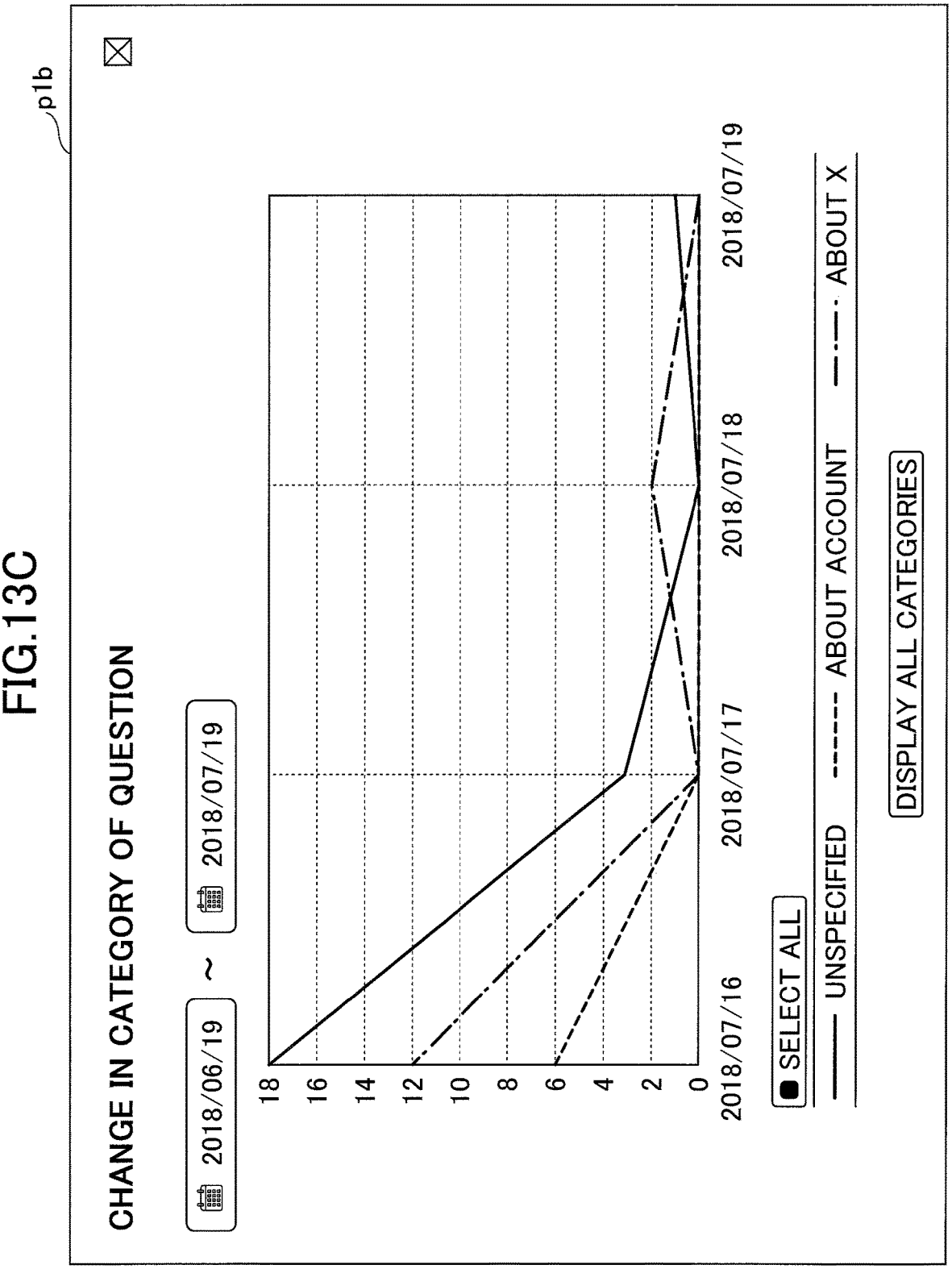

FIG.13E

QUESTION RANKING

[📅 2018/06/19] ~ [📅 2018/07/19]

| 1 | How to use easy delivery date estimator | 10 | SATISFACTION | 60% |
| 2 | Cannot login | 7 | SATISFACTION | 100% |
| 3 | Tell me about the latest OS | 4 | SATISFACTION | 100% | p1d

FIG.15

| | CATEGORY | SERVER RESPONSE | QUESTION ENTERED BY USER | ADVISABILITY |
|---|---|---|---|---|
| Q&A history 📅 2018/03/01 ~ 📅 2018/04/30  Q How to use easy delivery date estimator ||||
| 2018/04/16 10:31-10:50   ID 1234567 (p2a) ||||
| 2018/04/16 10:31-10:34  🖼 ABOUT DELIVERY DATE | @ Tell me about how to use easy delivery date estimator | How many units can I order at minimum? | Y |
| 2018/04/16 10:31-10:34  🖼 CATEGORY UNSPECIFIED | @ No Q&A | I tried, but still an error occurs. | |
| 2018/04/16 10:31-10:34  🖼 ABOUT DELIVERY DATE | @ Tell me about how to use easy delivery date estimator | | N |
| MEMO  I tried, but still an error occurs. I tried, but still an error occurs. I tried, but still an error occurs. ||||
| 2018/04/15 16:50-17:00   ID 112345 ||||
| 2018/04/15 16:50-17:00  🖼 ABOUT DELIVERY DATE | @ Tell me about how to use easy delivery date estimator | How many units can I order at minimum? | Y |
| 2018/04/15 16:50-17:00  🖼 CATEGORY UNSPECIFIED | @ Tell me about how to use easy delivery date estimator | I tried, but still an error occurs. | – |
| 2018/04/15 16:50-17:00  🖼 ABOUT ACCOUNT | @ Tell me about how to use easy delivery date estimator | I forgot "ID/Password". | N |
| MEMO  I tried, but still an error occurs. I tried, but still an error occurs. I tried, but still an error occurs. ||||

SESSION (first block), SESSION (second block)

FIG.17

Edit Q&A

Select category

[ Select category ▲▼ ]

Enter Question and Answer

[ Example: Can I ask for express processing? ]

[ Example: It depends on articles,
but an express processing fee is additionally required. ]

Option

Input rephrased question (optional)

[ Example: Is an earlier delivery date possible? ]

[ + add item ]

[ Save in hidden mode ]  [ Save in a viewable state ]

FIG.18

Edit synonym

Input keyword

* From 2 to 50 characters. Space and the following symbols (,\'"=>) cannot be used.

[Can order]

Input synonym

* From 2 to 50 characters. Space, line feed, and the following symbols (,\'"=>) cannot be used. "," cannot be used between sentences. Up to 19 words (words can be separated by ",").

[How to order]

[Save]

Q&A history

[📅 2018/03/01] ~ [📅 2018/03/31]    [Q | Necessary procedures when having a baby]

| | SESSION | | | |
|---|---|---|---|---|
| | 2018/03/30 14:01-14:10  ID 111222 | | | |
| 🖼 | 2018/03/30 14:01-14:10<br>AUSPICIOUS<br>EVENT | Q What are necessary procedures when having a baby? | Things needed to do when you have a baby | Y |
| 🖼 | 2018/03/30 14:01-14:10<br>AUSPICIOUS<br>EVENT | Q How to apply for congratulatory money for childbirth — p7a | Application for congratulatory money for childbirth | N |
| 🖼 | 2018/03/30 14:01-14:10<br>AUSPICIOUS<br>EVENT | Q What is a baby-birth gift? | congratulatory money for childbirth | |
| MEMO | | | | |
| CATEGORY | SERVER RESPONSE | QUESTION ENTERED BY USER | ADVIS-ABILITY | | p7

FIG.21B p8B

SERVICE PROVIDER

Do you have any question?
Please enter your question directly, or
please select a search option using buttons.

Search from selected category

See FAQ

USER

Application for congratulatory money for childbirth

Several candidates are found.
Is there an answer you are looking for?

List of necessary procedures when having a baby

Congratulatory money for childbirth

No desired answer is found

Congratulatory money for childbirth

When an employee or a spouse of an employee has given birth, congratulatory money for childbirth and part of expense for childbirth are paid, and maternity leave is granted. ---- p8Ba Does this answer solve your question?
Press YES or NO to exit.

YES

NO

NO

I apologize for inconvenience, but please contact customer service, or please try to ask again by changing a keyword or an option to be selected.

Do you have any question?
Please enter your question directly, or
please select a search option using buttons.

Search from selected category

See FAQ

FIG.22

Edit Q&A

Select category

[ AUSPICIOUS EVENT ▲▼ ]

Enter question and answer  * Up to 200 characters

List of necessary procedures when having a baby

When an employee or a spouse of an employee has given birth, the following applications are required:

1. Notification of change of family structure (Mandatory)
2. Application for congratulatory money for childbirth
3. (Health Insurance) Notification of change of dependents
4. (Health Insurance) Application for payment of maternity benefit
5. Application for stopping payment of commuting allowance Option Input rephrased question  * Up to 200 character

[ + add item ]

[ Save in a viewable state ]  [ Save in hidden mode ]

FIG.23

Q&A DB (after editing)

| ID | QUESTION | SIMILAR QUESTION | ANSWER | CATEGORY ID | UPDATED DATE/TIME |
|---|---|---|---|---|---|
| ... | ... | ... | ... | ... | ... |
| 1-1-3 | List of necessary procedures when having a baby | — | When an employee or a spouse of an employee has given birth, the following applications are required. By these applications, congratulatory money for childbirth and part of expense for childbirth are paid, and maternity leave is granted. In addition, you can make your child become your dependent under "Income Tax Act", "Health Insurance Act", and "Act on Advancement of Measures to Support Raising Next-Generation Children".<br>1. Notification of change of family structure (Mandatory)<br>2. Application for congratulatory money for childbirth<br>3. (Health Insurance) Notification of change of dependents<br>4. (Health Insurance) Application for payment of maternity benefit<br>5. Application for stopping payment of commuting allowance | 0-03 | 2018-05-08T08:42 |
| 1-1-4 | Payment of congratulatory money for childbirth | — | When an employee or a spouse of an employee has given birth, congratulatory money for childbirth and part of expense for childbirth are paid, and maternity leave is granted. | 0-03 | 2018-05-08T09:06 |
| ... | ... | ... | ... | ... | ... |
| 4-1-6 | How to use easy delivery date estimator | ... | Please select or input category of an article to be ordered. | 0-07 | 2018-06-12T14:20 |
| ... | ... | ... | ... | ... | ... |

INFORMATION PROCESSING APPARATUS AND INFORMATION PROCESSING METHOD

CROSS-REFERENCE TO RELATED APPLICATION

The present application claims priority under 35 U.S.C. § 119 to Japanese Patent Application No. 2018-186051, filed on Sep. 28, 2018, the contents of which are incorporated herein by reference in their entirety.

BACKGROUND OF THE INVENTION

1. Field of the Invention

The present disclosure relates to an information processing apparatus, an information processing method, and a program.

2. Description of the Related Art

Conventionally, a technology that may be termed as a chatbot is known, in which text, sound, or image entered from a user is caused to be recognized by an apparatus such as a computer, and in which the apparatus performs a conversation, a response to a question, device control, and the like.

For example, an information processing system that interacts with a user is disclosed in Patent Document 1. In this information processing system, by repeating a set of asking a user a question and retrieving an answer to the question from the user, information in which the user wishes to search is narrowed down. When a question is displayed on a user's terminal in the information processing system, information regarding a status of a narrowing-down process is displayed above the question, and information regarding a guide for answering the question is displayed below the question.

CITATION LIST

Patent Literature

[Patent Document 1] Japanese Unexamined Patent Application Publication No. 2018-092585

SUMMARY OF THE INVENTION

An information processing apparatus according to an embodiment of the present invention is communicable with a first terminal device, and is configured to transmit a message in response to receiving an inquiry. The information processing apparatus includes: an information storage unit configured to store reference information including at least one set of a question item and a response corresponding to the question item, the reference information being referenced when responding to the inquiry received from the first terminal device; a history storage unit configured to store, as history information, inquiries received from the first terminal device and messages that are transmitted or received with respect to the received inquiries; and a modification unit configured to update the reference information stored in the information storage unit by using the history information. The modification unit is configured to cause a first screen, on which information in the history information is rendered, to be displayed; to receive an operation of selecting, from the information rendered on the first screen, an item corresponding to change target information; to cause a second screen, for updating the reference information corresponding to the selected item, to be displayed; and to receive an updating operation for updating the reference information corresponding to the selected item through the second screen.

BRIEF DESCRIPTION OF THE DRAWINGS

FIG. 8 is a diagram illustrating an example of information stored in a category database according to the first embodiment;

FIG. 9 is a diagram illustrating an example of information stored in a Q&A database according to the first embodiment;

FIG. 10 is a diagram illustrating an example of information stored in an inquiry history database according to the first embodiment;

FIG. 11 is a diagram illustrating an example of information stored in an interaction history database according to the first embodiment;

FIGS. 13A to 13E are views illustrating examples of a display screen of feedback statistics displayed by a response processing unit according to the first embodiment;

FIG. 15 is a diagram illustrating an example of a Q&A history screen displayed by an administrator-side control unit according to the first embodiment;

FIG. 17 is a diagram illustrating an example of an editing screen of Q&A information displayed by the administrator-side control unit according to the first embodiment;

FIG. 18 is a diagram illustrating an example of a screen for editing a synonym displayed by the administrator-side control unit according to the first embodiment;

FIG. 20 is a diagram illustrating an example of the Q&A history screen displayed by the administrator-side control unit according to the first embodiment;

FIG. 21B is a diagram illustrating an example of the dialog screen reproduced by the management-side control unit according to the first embodiment;

FIG. 22 is a diagram illustrating an example of the editing screen of the Q&A information displayed by the administrator-side control unit according to the first embodiment;

FIG. 23 is a diagram illustrating an example of edited information stored in the Q&A database according to the first embodiment.

DESCRIPTION OF THE EMBODIMENTS

In recent years, interaction with users using a chatbot has been automated. Some services (services using a chatbot) require a user to enter a degree of satisfaction with respect to an answer provided in response to a user's question, in order to improve accuracy of the answer to the question. Such chatbot services may provide an administrator with statistics on users' satisfaction. From the statistics, the administrator can find out an answer with low satisfaction.

In an information processing apparatus such as a server that provides a chatbot service, Q&A information, which is a set of a question and an answer corresponding to the question, is registered in advance. The administrator communicates with the information processing apparatus to edit and improve Q&A information corresponding to an answer with low satisfaction. However, it is difficult to improve adequately question-and-answer information by only referring to the question-and-answer information. For this reason, the following improvement method can be considered.

Specifically, an administrator first searches for an interaction history between a user and an information processing apparatus, that is, a chat history, including an answer with low satisfaction, from past chat history stored in the information processing apparatus. Then, the administrator checks contents of the interaction included in the searched chat history, to examine what is to be improved. After deciding what is to be improved, the administrator searches for the question-and-answer information corresponding to the answer, and edits the searched question-and-answer information.

Thus, in a conventional information processing apparatus that provides a chatbot service, such as an information processing apparatus disclosed in Patent Document 1, improving the registered information corresponding to a specific answer requires considerable labor and difficulty.

Accordingly, the present disclosure provides an information processing apparatus, an information processing method, and a program that simplify an editing operation for improving registered information and the like corresponding to a particular answer.

Hereinafter, embodiments of the present invention will be described with reference to the accompanying drawings. In the present specification and the drawings, components having substantially the same functional configuration are the same reference symbols, and duplicate description will be omitted.

First Embodiment

An information processing apparatus according to the first embodiment will be described. In the present embodiment, an information processing apparatus is a part of a chatbot system 100, and is a server 1 that provides a chatbot service to a user terminal 2. The server 1 is an example of an information processing apparatus.

<Configuration of Chatbot System 100>

Figure 1:
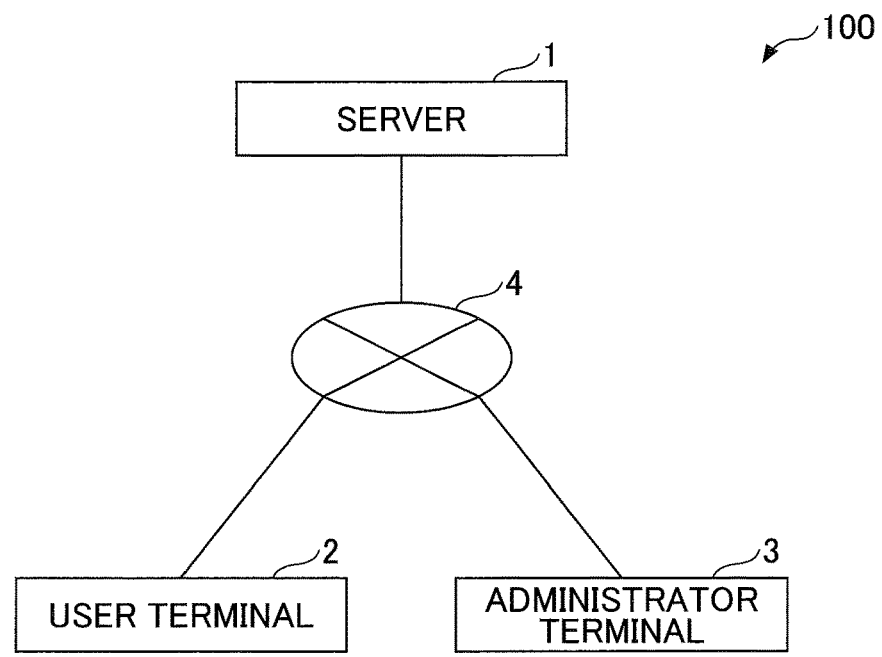
FIG. 1 is a diagram illustrating an example of a configuration of a chatbot system including a server according to a first embodiment.

FIG. 1 is a diagram illustrating an example of a configuration of the chatbot system 100 including the server 1 according to a first embodiment. As illustrated in FIG. 1, the chatbot system 100 includes the server 1, a user terminal 2, and an administrator terminal 3. The server 1 is an apparatus that provides a chatbot service to a user. The user terminal 2 is a terminal device for a user using the chatbot service, and the administrator terminal 3 is a chatbot service administrator's terminal device. The user terminal 2 and the administrator terminal 3 are examples of terminal devices.

The server 1, the user terminal 2, and the administrator terminal 3 are coupled with each other through a communication network 4. The user terminal 2 communicates with the server 1 through the communication network 4, and the administrator terminal 3 communicates with the server 1 through the communication network 4. In the present embodiment, the communication network 4 is the Internet, but is not limited thereto. For example, the communication network 4 may be a wired local area network (LAN), a wireless LAN, a mobile communication network, a telephone network, or other communication networks using wired or wireless communication.

The server 1 communicates with the above-described terminal devices (user terminal and administrator terminal), and transmits message information in response to information received from the terminal devices. For example, the server 1 provides a bot service that provides an answer to a user's question, and an instant messaging service that offers message communication with a user (i.e. chat). However, in another embodiment, a message transmitting and receiving server, which is different from the server 1, may be connected to the communication network 4 to offer an instant messaging service, and the server 1 may perform chat with the user terminal 2 using the instant messaging service provided by the message transmitting and receiving server.

In the present embodiment, the administrator terminal 3 and the server 1 are physically separate, but the administrator terminal 3 and the server 1 may be an integrated apparatus. Also, each of the server 1 and the administrator terminal 3 may be configured by one or more devices. If the server 1 or the administrator terminal 3 is configured by more than one device, the devices may be located in a single chassis, or each of the devices may be located in separate chassis. As used herein and in the claims, "apparatus" may mean not only one apparatus (or device), but also a system constituted by multiple apparatuses (devices).

Figure 2:
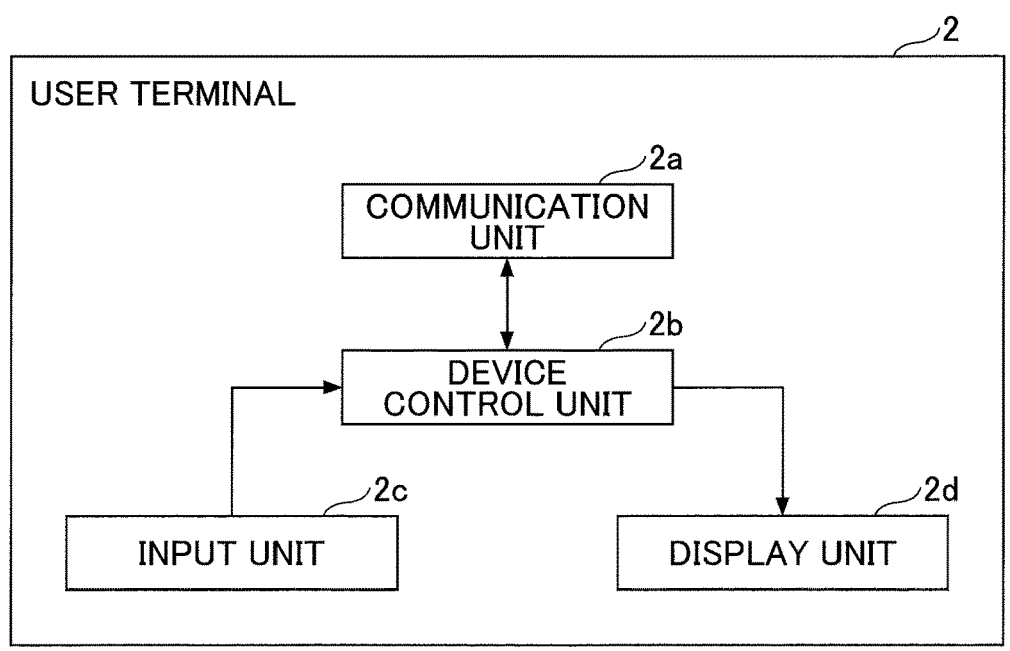
FIG. 2 is a diagram illustrating an example of a functional configuration of a user terminal according to the first embodiment.

FIG. 2 is a diagram illustrating an example of a functional configuration of the user terminal 2 according to the first embodiment. As illustrated in FIG. 2, the user terminal 2 includes a communication unit 2a, a device control unit 2b, an input unit 2c, and a display unit 2d. The communication unit 2a communicates with the server 1 through the communication network 4. The device control unit 2b controls an overall operation of the user terminal 2. For example, the device control unit 2b transmits and receives information and commands through the communication unit 2a. The device control unit 2b controls an operation of an interactive application which is an application (program) for receiving a chatbot service from the server 1, in accordance with the program. The input unit 2c receives, from a user, inputs of information, commands, and the like, and outputs them to the device control unit 2b. The display unit 2d displays various screens (windows) based on a control by the device control unit 2b. For example, the display unit 2d displays a screen for starting the interactive application and a screen during execution of the interactive application. The display unit 2d may also serve as an input unit 2c. The interactive application may be embodied by installing, into the user terminal 2, a program for causing the user terminal 2 to execute the interactive application, or may be embodied as an application program that runs on a world wide web (WWW) browser (may also be referred to as a "web browser").

Figure 3:
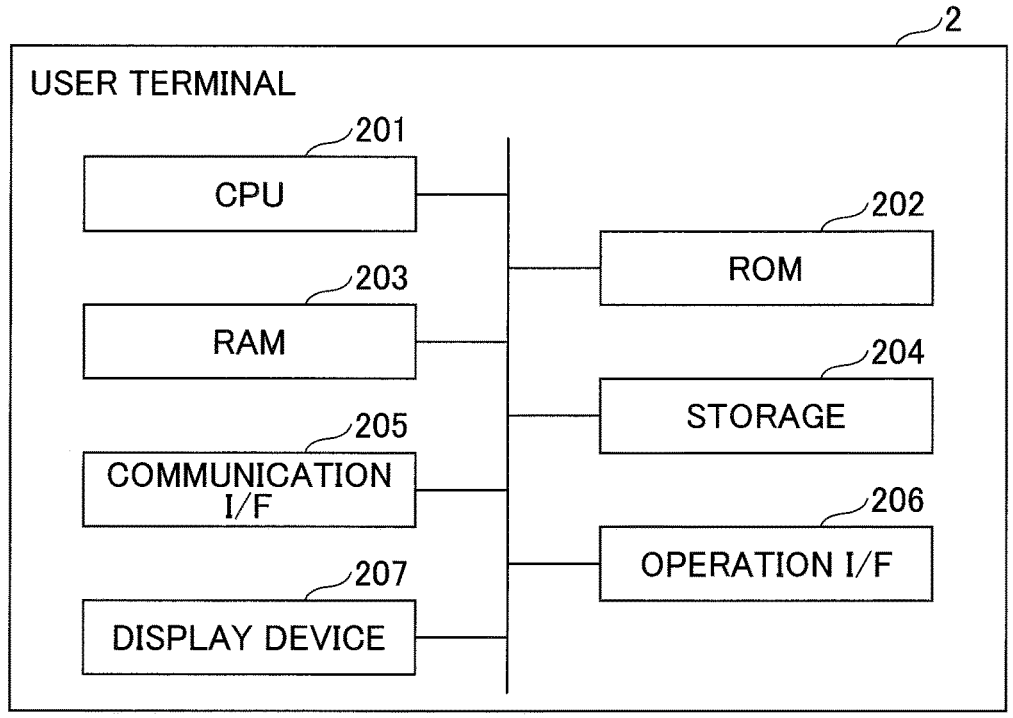
FIG. 3 is a diagram illustrating an example of a hardware configuration of the user terminal according to the first embodiment.

FIG. 3 is a diagram illustrating an example of a hardware configuration of the user terminal 2 according to the first embodiment. As illustrated in FIG. 3, components of the user terminal 2 include a central processing unit (CPU) 201, a read only memory (ROM) 202, a random access memory (RAM) 203, a storage 204, a communication interface (I/F) 205, an operation I/F 206, and a display device 207. Each of these components is interconnected with, for example, a bus. These components may be interconnected through either wired communication or wireless communication.

An example of the user terminal 2 includes a computing device such as a personal computer, a smartphone, and a tablet.

The communication I/F 205 realizes a function of the communication unit 2a. The communication I/F 205 may include a connection terminal, communication circuitry, and the like. The operation I/F 206 realizes a function of the input unit 2c. The operation I/F 206 may include an input device such as a button, a rotary dial, a key, a touch panel, or a microphone for voice input. The display device 207 realizes a function of the display unit 2d. The display device 207 may be a display such as a liquid crystal display panel, an organic electroluminescence (EL) display, and an inorganic EL display. The display device 207 may be a touch panel that also serves as the operation I/F 206.

The storage 204 stores various types of information. For example, the storage 204 stores information acquired via the communication network 4. The storage 204 may be configured by a storage device such as a volatile or non-volatile semiconductor memory, a hard disk drive (HDD), or a solid state drive (SSD). The storage 204 may include the ROM 202 and/or the RAM 203.

The CPU 201 realizes a function of the device control unit 2b. The CPU 201 is configured by a processor and the like, the ROM 202 is configured by a non-volatile semiconductor memory device and the like, and the RAM 203 is configured by a volatile semiconductor memory device and the like. A program for embodying the device control unit 2b is stored in the ROM 202 or the storage 204 in advance. The program is loaded, from the ROM 202 or the storage 204, into the RAM 203 by the CPU 201. The CPU 201 executes each instruction code in the program loaded into the RAM 203. Where the program is stored is not limited to the ROM 202 and the storage 204, and the program may be stored in a non-volatile (non-transitory) computer-readable recording medium such as a recording disk. The program may also be transmitted over a wired network, a wireless network, broadcasting, or the like, and loaded into the RAM 203.

The device control unit 2b, which is a functional component embodied by the CPU 201, may be implemented by a program execution section such as the CPU 201, may be implemented by dedicated circuitry, or may be implemented by a combination of a program execution section and dedicated circuitry. For example, such a functional component may be implemented as an integrated circuit such as an LSI (Large Scale Integration). Each functional element in a functional component such as the device control unit 2b may be implemented into a different chip, or part or all of the functional elements in the functional component may be implemented into a single chip. As an LSI, a field programmable gate array (FPGA) that can be programmed after production, a reconfigurable processor that can reconfigure a connection and/or a setting of circuit cells within the LSI, or an application specific integrated circuit (ASIC) into which multiple circuits for particular applications are integrated, may be used.

Figure 4:
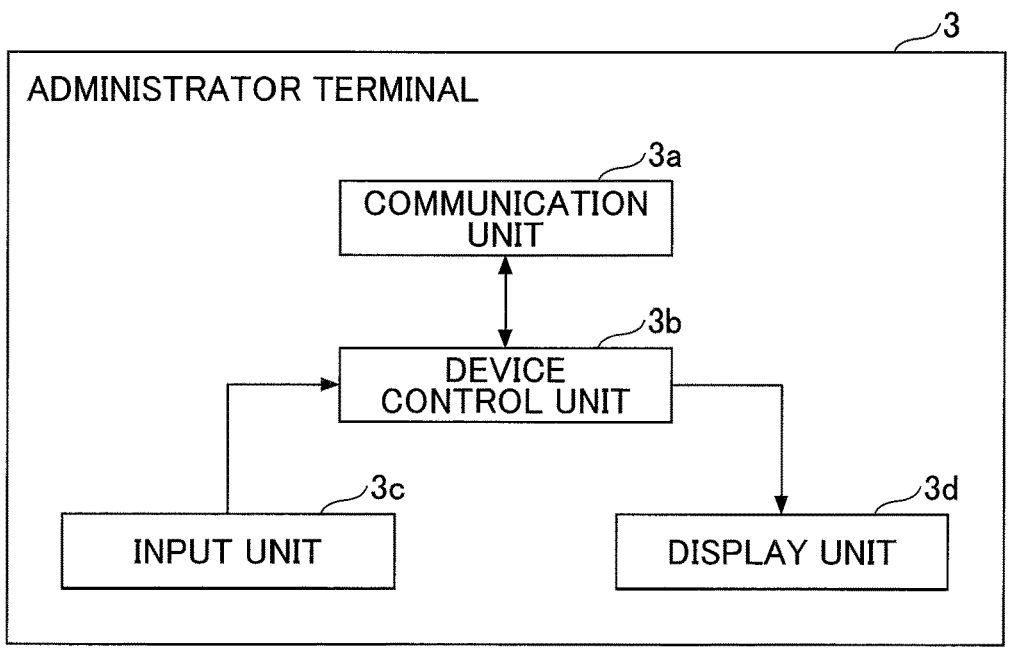
FIG. 4 is a diagram illustrating an example of a functional configuration of an administrator terminal according to the first embodiment.

FIG. 4 is a diagram illustrating an example of a functional configuration of the administrator terminal 3 according to the first embodiment. As illustrated in FIG. 4, the administrator terminal 3 includes a communication unit 3a, a device control unit 3b, an input unit 3c, and a display unit 3d. The communication unit 3a communicates with the server 1 through the communication network 4. The device control unit 3b controls an entire operation of the administrator terminal 3. For example, the device control unit 3b transmits and receives information and commands through the communication unit 3a. The device control unit 3b controls an operation of a management application that is an application for managing a setting of the chatbot service on the server 1, according to a program. The input unit 3c receives inputs such as information and commands from an administrator, and outputs them to the device control unit 3b. The display unit 3d displays various screens in accordance with control of the device control unit 3b. For example, the display unit 3d displays a screen for starting the management application and a screen during execution of the management application. The display unit 3d may also serve as the input unit 3c. The management application may be embodied by installing, into the administrator terminal 3, a program for causing the administrator terminal 3 to execute the management application. Also, the management application may be used via a web browser.

Figure 5:
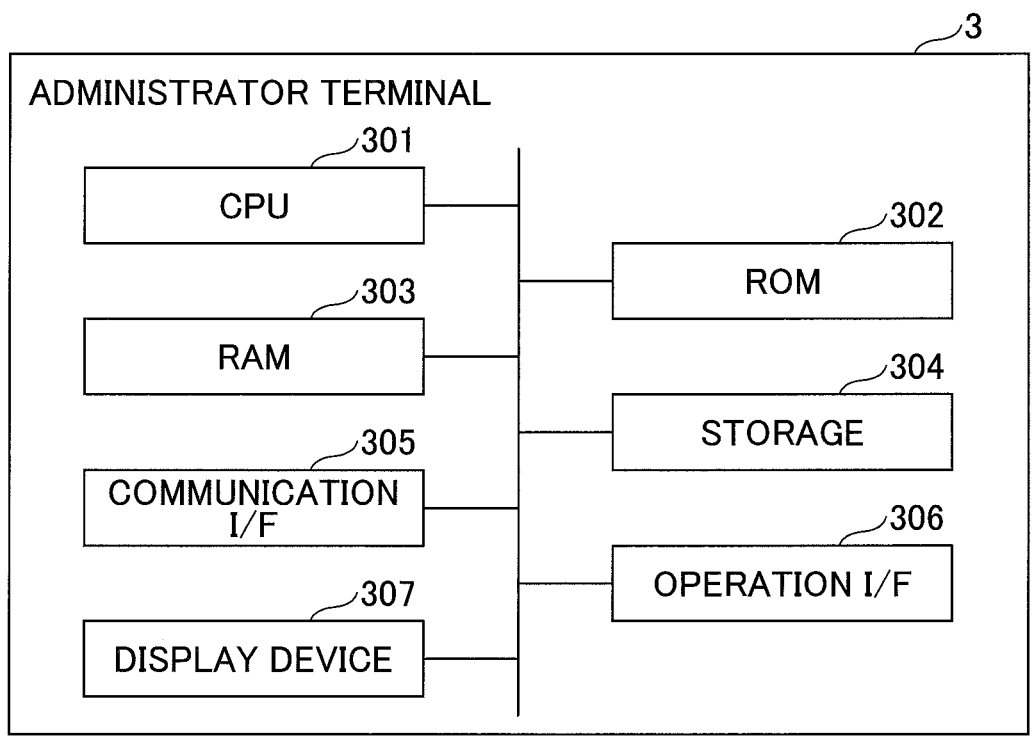
FIG. 5 is a diagram illustrating an example of a hardware configuration of the administrator terminal according to the first embodiment.

FIG. 5 is a diagram illustrating an example of a hardware configuration of the administrator terminal 3 according to the first embodiment. As illustrated in FIG. 5, components of the administrator terminal 3 include a CPU 301, a ROM 302, a RAM 303, a storage 304, a communication I/F 305, an operation I/F 306, and a display device 307. Each of these components is interconnected with, for example, a bus. The components may be interconnected via either wired communication or wireless communication.

An example of the administrator terminal 3 includes a computing device such as a personal computer, a smartphone, and a tablet.

The communication I/F 305 realizes a function of the communication unit 3a. The operation I/F 306 realizes a function of the input unit 3c. The operation I/F 306 may include an input device such as a button, a rotary dial, a key, a touch panel, or a microphone. The display device 307 realizes a function of the display unit 2d. An example of the display device 307 includes a liquid crystal display panel, an organic EL display, and an inorganic EL display. The display device 307 may be a touch panel that also serves as the operation I/F 306.

The storage 304 stores various types of information. For example, the storage 304 stores information acquired via the communication network 4. The storage 304 is configured by a storage device such as a volatile or non-volatile semiconductor memory, an HDD, or an SSD. The storage 304 may include the ROM 302 and/or the RAM 303.

The CPU 301 realizes a function of the device control unit 3b. The CPU 301 is configured by a processor or the like, the ROM 302 is configured by a non-volatile semiconductor memory device and the like, and the RAM 303 is configured by a volatile semiconductor memory device and the like. The configurations of the CPU 301, the ROM 302, and the RAM 303 are similar to the configurations of the CPU 201, ROM 202, and RAM 203, respectively. A program for embodying the device control unit 3b is stored in the ROM 302 or the storage 304, but may be stored in a non-volatile (non-transitory) computer-readable recording medium such as a recording disk. The program may also be transmitted over a wired network, a wireless network, broadcasting, or the like, and loaded into the RAM 303. The device control unit 3b may be implemented by a program execution section such as the CPU 301, may be implemented by dedicated circuitry, or may be implemented by a combination of a program execution section and dedicated circuitry.

Figure 6:
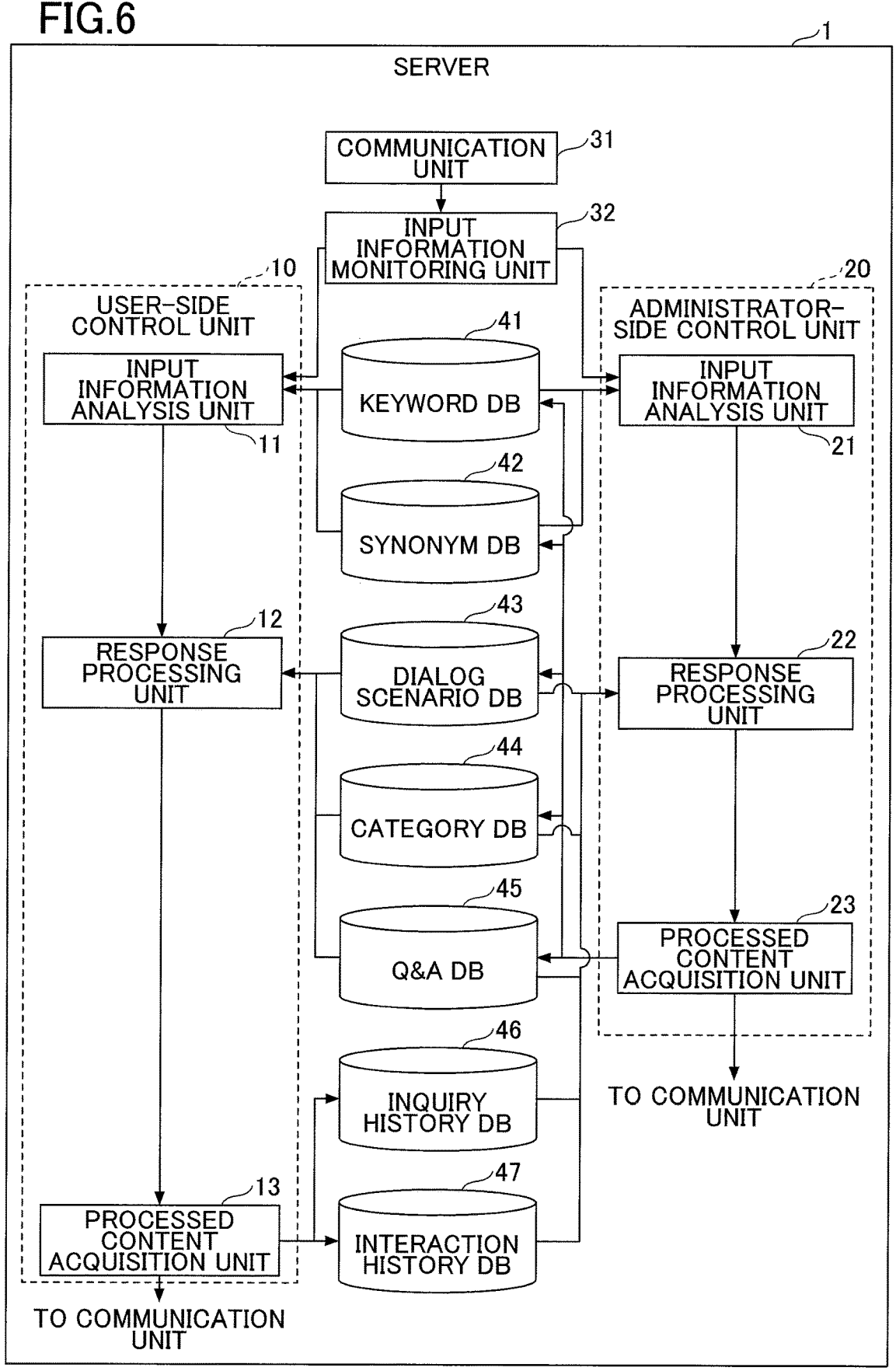
FIG. 6 is a diagram illustrating an example of a functional configuration of the server according to the first embodiment.

FIG. 6 is a diagram illustrating an example of a functional configuration of the server 1 according to the first embodiment. As illustrated in FIG. 6, the server 1 includes a communication unit 31, an input information monitoring unit 32, a user-side control unit 10, an administrator-side control unit 20, and multiple databases (DBs) 41 to 47. The multiple DBs include a keyword DB 41, a synonym DB 42, a dialog scenario DB 43, a category DB 44, a question-and-answer DB 45 (may also be referred to as a "Q&A DB 45"), an inquiry history DB 46, and an interaction history DB 47. Here, the communication unit 31 is an example of a transmission unit and a reception unit. The administrator-side control unit 20 is an example of a modification unit. The user-side control unit 10 is an example of an evaluation reception unit, and the administrator-side control unit 20 is an example of an evaluation display unit. The keyword DB 41, the synonym DB 42, the dialog scenario DB 43, the category DB 44, and the Q&A DB 45 are examples of information storage unit. The inquiry history DB 46 and the interaction history DB 47 are examples of history storage unit.

The communication unit 31 communicates with the user terminal 2 and the administrator terminal 3 through the communication network 4. The input information monitoring unit 32 receives information and a command from the user terminal 2 and the administrator terminal 3 through the communication unit 31, and selectively outputs the information and the command to the user-side control unit 10 or the administrator-side control unit 20. For example, the input information monitoring unit 32 outputs, to the user-side control unit 10, information received from the interactive application, and outputs, to the administrator-side control unit 20, information received from the management application.

The user-side control unit 10 controls a response or the like that the server 1 sends to a user through the user terminal 2 on which the interactive application is activated. For example, the user-side control unit 10 outputs, to the user terminal 2, response information in response to inquiry information sent from the user terminal 2. The user-side control unit 10 includes an input information analysis unit 11, a response processing unit 12, and a processed content acquisition unit 13. These are discussed in more detail below.

The administrator-side control unit 20 controls presentation of various types of information related to the chatbot service, to the administrator terminal 3 in which the management application is being activated. Also, the administrator-side control unit 20 controls setting and editing of various types of information related to the chatbot service, which is received from the administrator terminal 3 in which the management application is being activated. For example, the administrator-side control unit 20 maintains each of the DBs 41 to 47. Specifically, the administrator-side control unit 20 receives, from the administrator terminal 3, an operation for storing or editing information in each of the DBs 41 to 47, and executes it. Also, the administrator-side control unit 20 presents or outputs information stored in each of the DBs 41 to 47, in response to a request from the administrator terminal 3. The administrator-side control unit 20 controls storing and modifying information including a question item and a response corresponding to the question item, and controls storing a history of communication information that is input or output with respect to inquiry information input to the user-side control unit 10. The administrator-side control unit 20 includes an input information analysis unit 21, a response processing unit 22, and a processed content acquisition unit 23. These are discussed in more detail below.

Figure 7:
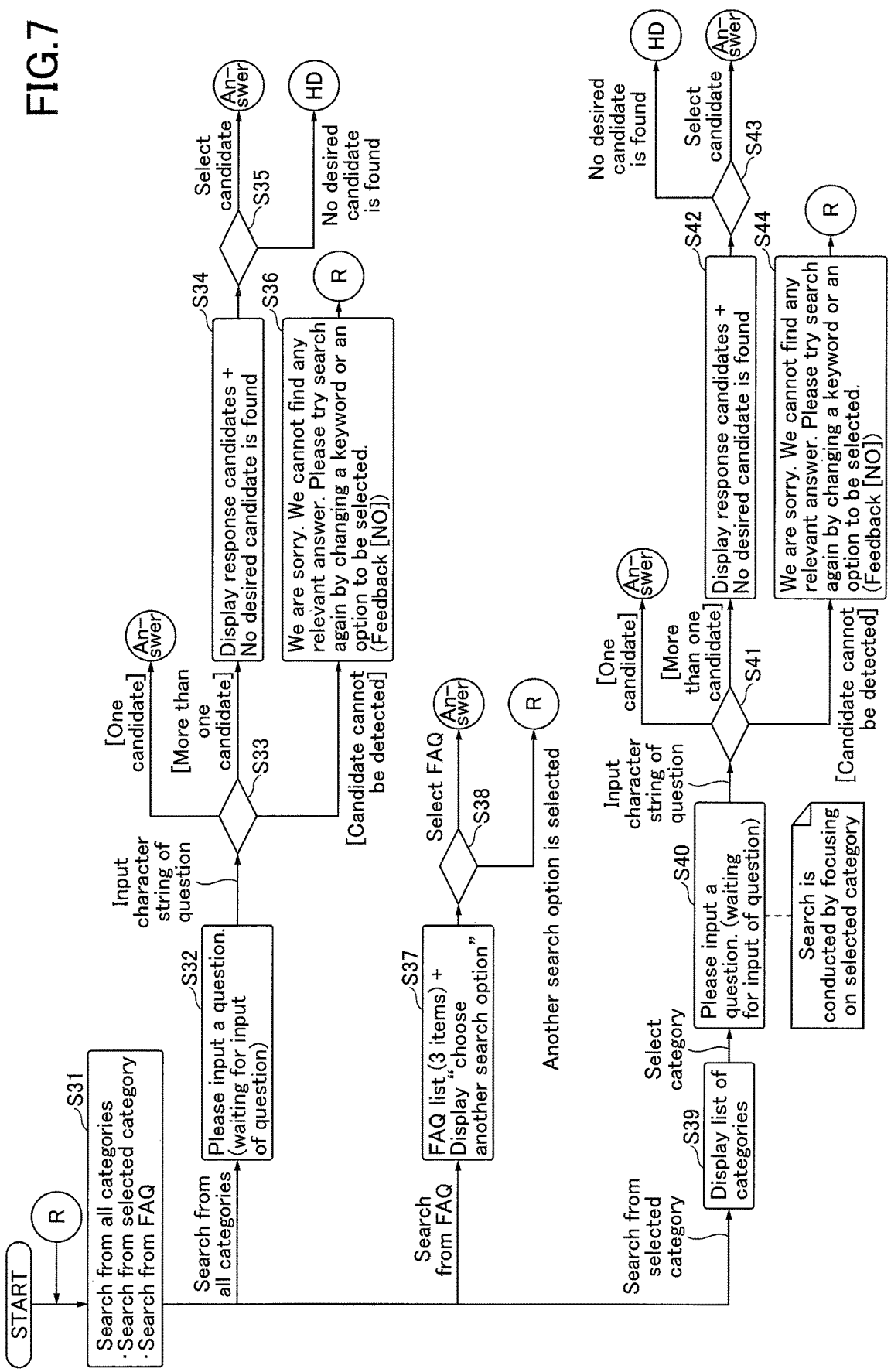
FIG. 7 is a diagram illustrating an example of scenario information stored in a dialog scenario database according to the first embodiment.

The dialog scenario DB 43 stores interactive scenario information corresponding to an input from the user. The user-side control unit 10 performs an interaction with the user in accordance with the scenario information in the dialog scenario DB 43. For example, FIG. 7 illustrates an example of the scenario information according to the first embodiment. As the scenario information, FIG. 7 illustrates a flowchart illustrating a process flow until an answer corresponding to a user's question is output. Details of the scenario information will be described below.

The category DB 44 stores category information for classifying questions. For example, as illustrated in FIG. 8, each entry of the category information (note that each row represents an entry of the category information) includes a character string indicating a name of a category to which a question is classified, an ID of the entry of the category information (may be referred to as a category information ID), and an updated date and time of the entry of the category information. FIG. 8 is a diagram illustrating an example of information stored in the category DB 44 according to the first embodiment.

The Q&A DB 45 stores Q&A information items, each of which includes a question and an answer corresponding to the question. Each of the Q&A information items is pre-generated and stored in the Q&A DB 45. For example, as illustrated in FIG. 9, each of the Q&A information items includes a character string of a question (may also be referred to as a "question item"), an ID of the entry of the Q&A information (may be referred to as a "Q&A information ID"), a character string of a question similar to the question, a character string of an answer (response) to the question, a category ID to which the question is classified, and an updated date and time of the Q&A information item. FIG. 9 is a diagram illustrating an example of information stored in the Q&A DB 45 according to the first embodiment.

The keyword DB 41 stores a keyword which is a character string representing characteristics of a question and an answer that are included in each of the Q&A information items (character strings of a question and an answer in the Q&A information items) The keyword may be a word, a phrase, or a sentence. The keyword DB 41 may store a related keyword other than words in the Q&A information items. The user-side control unit 10 extracts a keyword from an inquiry (question) entered by a user, by decomposing a character string of the inquiry into words, and by matching the decomposed word against the keyword DB 41. Further, the user-side control unit 10 finds a Q&A information item corresponding to the question entered by the user, by matching the detected keyword against character strings of the questions in the Q&A DB 45.

The synonym DB 42 stores information about a synonym (synonym information) of a character string of a word, such as a keyword in the keyword DB 41. The synonym information includes character strings having similar meanings to each other. Each of the character strings may be a word, a phrase, or a sentence. The character strings having similar meanings to each other stored in the synonym DB 42 are not limited to character strings with similar meanings. For example, a set of a first character string and a second character string that is inferable from the first character string may also be stored in the synonym DB 42 as character strings having similar meanings to each other. In addition, a set of a first character string and a second character string that is part of the first character string may also be stored in the synonym DB 42 as character strings having similar meanings to each other. Alternatively, character strings that are used in a similar circumstance may also be stored in the synonym DB 42 as character strings having similar meanings to each other. That is, character strings having similar meanings to each other may be defined in accordance with use environment.

The user-side control unit 10 specifies a synonym of a character string of an inquiry (question) entered by a user, by decomposing the character string of the inquiry into words, and by matching the decomposed word against the synonym DB 42. The user-side control unit 10 infers a keyword by matching the character strings of the word in the inquiry and the synonym against the keyword DB 41.

The inquiry history DB 46 stores inquiry history information that is a history of an inquiry entered by a user. For example, as illustrated in FIG. 10, each inquiry history information entry includes an ID of the inquiry history information entry, a character string of a question entered by a user, an ID of an interaction session containing the question (this ID may also be referred to as an "interaction session ID"), an ID of the Q&A information item corresponding to the question (this ID may also be referred to as a "category ID"), an ID of the category information corresponding to the Q&A information item, user feedback information for an answer to the question, and a date and time when the question was input. FIG. 10 is a diagram illustrating an example of information stored in the inquiry history DB 46 according to the first embodiment.

The interaction session represents a series of dialogs between a user and the server 1. For example, dialog(s) included in the same interaction session is a series of dialogs performed during a period from a time when a screen for an interaction such as a chat type interaction is opened in the user terminal 2 to a time when the screen is closed, or a series of dialogs performed during a period from a time when the screen is opened to a time when the screen is forcibly closed because of session timeout. An event of session timeout occurs when no action is taken to the user terminal 2 within a predetermined period, to terminate the screen for the interaction.

Definition of the interaction session is not limited to the above-described definition. For example, an interaction session may indicate a series of dialogs performed between a user and the server 1, during a period that starts when a question is entered by a user and that ends when feedback with respect to an answer provided by the server 1 is entered. In this case, an interaction session is completed each time feedback is received from the user.

The interaction history DB 47 stores interaction history information that is a history of a user's statement entered to the user terminal 2 and a server's statement output from the server 1, in the interaction between the user and the server 1. For example, as illustrated in FIG. 11, each entry of the interaction history information includes an ID of the entry of the interaction history information, a character string of a content stated (sent) by the user or the server 1, an ID of the interaction session in which the statement was stated (sent), a sender of (the content of) the statement, a statement type ID of the statement, a content ID of (the content of) the statement, and a date and time when the statement is sent. FIG. 11 is a diagram illustrating an example of information stored in an interaction history DB 47 according to the first embodiment.

The statement type ID indicates a type of the statement. Specifically, statement type IDs of "5-0", "5-1", and "5-2" indicate that the content of the statement belongs to "Category", "Q&A Information", and "Scenario", respectively. The content ID indicates a content associated with the statement type ID. For example, in a case in which a statement type associated with a certain content ID is "scenario" (i.e. in a case of a statement type ID being "5-2"), the certain content ID indicates a statement included in scenario information. Also, in a case in which a statement type associated with a certain content ID is "Q&A information" (i.e. in a case of a statement type ID being "5-1"), the certain content ID indicates an ID of the Q&A information item. Further, in a case in which a statement type associated with a certain content ID is "Category" (i.e. in a case of a statement type ID being "5-0"), the certain content ID indicates a statement for selecting a category.

Figure 12:
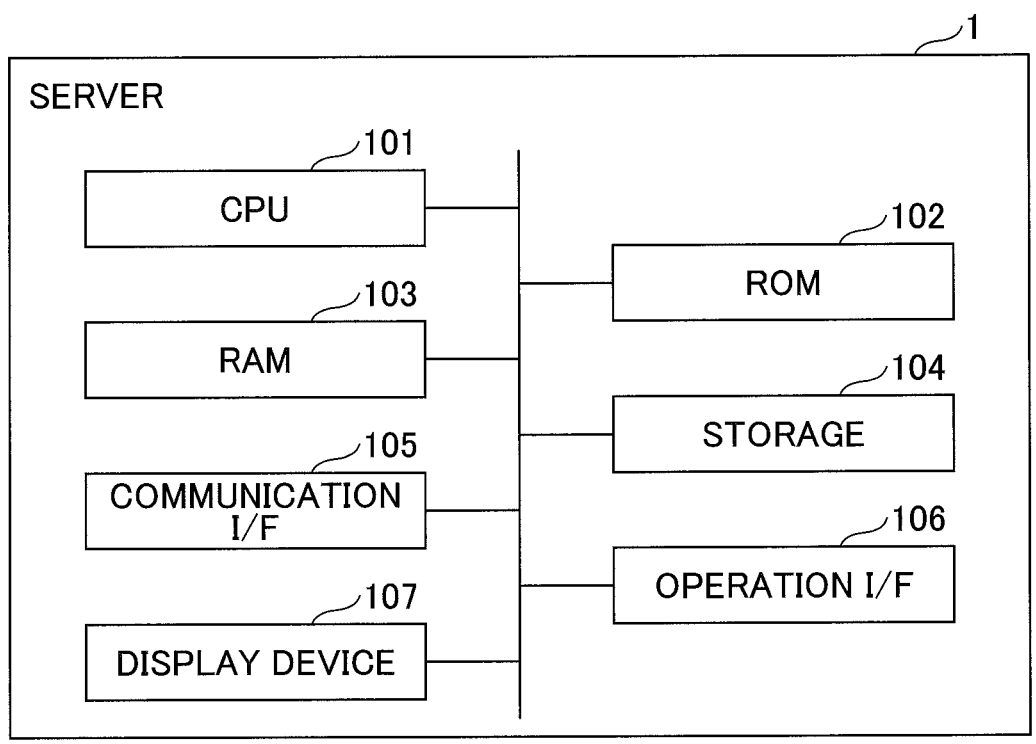
FIG. 12 is a diagram illustrating an example of a hardware configuration of the server according to the first embodiment.

FIG. 12 is a diagram illustrating an example of a hardware configuration of the server 1 according to the first embodiment. As illustrated in FIG. 12, components of the server 1 include a CPU 101, a ROM 102, a RAM 103, a storage 104, a communication I/F 105, an operation I/F 106, and a display device 107. Each of these components is connected to one another via, for example, a bus. The components may be interconnected via either wired communication or wireless communication.

An example of a server 1 is a computing device. According to the present embodiment, the server 1 includes a cloud server, but is not limited thereto.

The communication I/F 105 realizes a function of the communication unit 31. The operation I/F 106 receives an input such as information and a command from an operator or the like. The operation I/F 106 may include an input device such as a button, a rotary dial, a key, a touch panel, or a microphone for voice input. The display device 107 displays a processing result or the like as a screen. An example of the display devices 107 is a liquid crystal display panel, an organic EL display, and an inorganic EL display. The display device 107 may be a touch panel that also serves as the operation I/F 106.

The storage 104 stores various types of information, and realizes functions of the keyword DB 41, the synonym DB 42, the dialog scenario DB 43, the category DB 44, the Q&A DB 45, the inquiry history DB 46, and the interaction history DB 47. The storage 104 is configured by a storage device such as a volatile or non-volatile semiconductor memory, an HDD, or an SSD. The storage 104 may include the ROM 102 and/or the RAM 103.

The CPU 101 controls an overall operation of the server 1. The CPU 101 realizes functions of the input information monitoring unit 32, the user-side control unit 10, and the administrator-side control unit 20. The CPU 101 is configured by a processor or the like, the ROM 102 is configured by a non-volatile semiconductor storage device and the like, and the RAM 103 is configured by a volatile semiconductor storage device and the like. Configurations of the CPU 101, the ROM 102, and the RAM 103 are similar to those of the CPU 201, the ROM 202, and the RAM 203. The program for operating the server 1 is stored in the ROM 102 and the storage 104, but may be stored in a non-volatile (non-transitory) computer-readable recording medium such as a recording disk. The program may also be transmitted over a wired network, a wireless network, broadcasting or the like, and may be loaded into the RAM 103. The input information monitoring unit 32, the user side control unit 10, and the administrator-side control unit 20 may be implemented by a program execution section such as the CPU 101, may be implemented by dedicated circuitry, or may be implemented by a combination of a program execution section and dedicated circuitry.

<Details of Scenario Information>

Details of the scenario information illustrated in FIG. 7 will be described. When interacting with the user through the user terminal 2, the user-side control unit 10 of the server 1 controls the interactive application in accordance with the scenario information illustrated in FIG. 7. Specifically, first, the user-side control unit 10 causes the user terminal 2 to display a selection menu of a question searching method (step S31). For example, the selection menu includes three options: "Search from all categories", "Search from selected category", and "Search from FAQ" (note that "FAQ" stands for frequently asked questions), but in another embodiment, the selection menu may include more than three options or less than three options.

If "Search from all categories" is selected at step S31, the user-side control unit 10 causes the user terminal 2 to display a message prompting to input a question (step S32). When a character string of the question is input by the user, the user-side control unit 10 searches for candidate(s) of a response to the question corresponding to the character string, from the Q&A DB 45 by analyzing the character string (step S33). The user-side control unit 10 searches the Q&A DB 45 to extract the Q&A information item corresponding to the question, by using a keyword inferred from a word included in the question and a synonym of the word. Therefore, multiple candidates of the response (may also be referred to as "response candidates") may be obtained.

If one candidate of the response is obtained at step S33, the user-side control unit 10 responds by using this candidate. If two or more candidates of the response is obtained at step S33, the user-side control unit 10 causes the user terminal 2 to display a message prompting to select one of the candidates of the response or not to select any of the response candidates (step S34), and step S35 is executed next. If the response candidate is selected at step S35, the user-side control unit 10 responds using the candidate. If the response candidate is not selected at step S35, the user-side control unit 10 causes the user terminal 2 to display a message of apology stating that a response to the question cannot be displayed at present. If a candidate of the response cannot be detected at step S33, the user-side control unit 10 causes the user terminal 2 to display a message of apology and a message prompting to retry search (step S36), and a process reverts to step S31.

If "Search from selected category" is selected at step S31, the user-side control unit 10 causes the user terminal 2 to display a list of category names of the categories that can be selected by the user (step S39). When a category is specified by the user, the user-side control unit 10 causes the user terminal 2 to display a message prompting to input a question (step S40). When the user inputs a question corresponding to the selected category, the user-side control unit 10 searches for the Q&A information item in the Q&A DB 45 that corresponds to the selected category, to extract the Q&A information item corresponding to the input question (step S41).

If one response candidate is obtained at step S41, the user-side control unit 10 responds by using the candidate. If two or more response candidates are obtained at step S41, the user-side control unit 10 causes the user terminal 2 to display a message prompting to select one of the response candidates or not to select any of the response candidates (step S42), and step S43 is executed next. At step S43, if one response candidate is selected, the user-side control unit 10 responds by using the candidate. If no response candidate is selected at step S43, the user-side control unit 10 causes the user terminal 2 to display an apology message stating that the response candidate cannot be displayed at present. Further, if a response candidate cannot be detected at step S41, the user-side control unit 10 causes the user terminal 2 to display an apology message and a message prompting to retry search (step S44), and the process returns to step S31.

If "Search from FAQ" is selected at step S31, the user-side control unit 10 refers to the inquiry history DB 46 to extract one or more questions (three questions for example) that are frequently asked, and causes the user terminal 2 to display a list of the one or more questions (step S37). At this time, the user-side control unit 10 also causes the user terminal 2 to display a message asking whether a user wants to choose another search option.

If a question is selected from the list of the questions, the user-side control unit 10 reads outs a response to the question from the Q&A DB 45, and causes the user terminal 2 to display the response (step S38). If another search method is selected, the process returns to step S31.

<Specific Configuration of User-Side Control Unit 10>

A specific configuration of the user-side control unit 10 illustrated in FIG. 6 will be described. The input information analysis unit 11 analyzes information input to the user terminal 2 by a user, and outputs the analyzed information to the response processing unit 12. For example, the input information analysis unit 11 analyzes a character string of a question input by the user. Specifically, the input information analysis unit 11 decomposes the character string of the question input by the user and extracts words by performing, for example, morphological analysis. Further, the input information analysis unit 11 extracts synonym(s) of the extracted words by referring to the synonym DB 42. The input information analysis unit 11 estimates a keyword by matching character strings of the extracted words and their synonyms against the keyword DB 41.

The response processing unit 12 generates communication information (a type of a response) in response to information input to the user terminal 2. For example, the response processing unit 12 generates communication information with respect to information selected on a screen of the display unit 2d of the user terminal 2, and communication information with respect to a character string input to the user terminal 2.

For example, when an option included in the scenario information is selected on the screen of the display unit 2d, the response processing unit 12 outputs a message corresponding to the selected option to the user terminal 2 by referring to the dialog scenario DB 43. In a case in which a character string of a question is entered, the response processing unit 12 searches for Q&A information item corresponding to the question, by matching a keyword estimated by the input information analysis unit 11 against the Q&A DB 45. The response processing unit 12 outputs the searched Q&A information item to the user terminal 2. For example, in a case in which an option included in the category information is selected, the response processing unit 12 conducts a search for Q&A information item by focusing on the selected category in the Q&A DB 45.

The processed content acquisition unit 13 acquires and stores information processed and output by the response processing unit 12. For example, the processed content acquisition unit 13 stores, as inquiry history information, information about an answer to a question that is output by the response processing unit 12, into the inquiry history DB 46. In the process of outputting an answer to a question performed by the response processing unit 12, the processed content acquisition unit 13 stores contents of statements that are input or output by the server 1 and the user terminal 2 as interaction history information into the interaction history DB 47.

<Specific Configuration of Administrator-Side Control Unit 20>

A specific configuration of the administrator-side control unit 20 illustrated in FIG. 6 will be described. The input information analysis unit 21 analyzes information input to the administrator terminal 3 by and administrator or the like, and outputs the analyzed information to the response processing unit 22. For example, the input information analysis unit 21 analyzes a character string input by the administrator or the like. Similar to the user-side control unit 10, the input information analysis unit 21 extracts words and estimates a keyword corresponding to the words and their synonyms.

The response processing unit 22 generates communication information to information input to the administrator-side control unit 20. For example, the response processing unit 22 generates communication information with respect to information selected on a screen of the display unit 3d of the administrator terminal 3, and communication information with respect to a character string input to the administrator terminal 3.

For example, the response processing unit 22 updates (such as modifies, adds, or deletes) information stored in each DB, in accordance with an instruction input from an administrator or the like. Specifically, the response processing unit 22 modifies or deletes an existing keyword, or adds a new keyword to the keyword DB 41. The response processing unit 22 changes or deletes an existing synonym from synonym information of the synonym DB 42, or adds a new synonym to the synonym information of the synonym DB 42. The response processing unit 22 edits or deletes existing scenario information from the dialog scenario DB 43, or adds new scenario information to the dialog scenario DB 43. The response processing unit 22 changes or deletes an existing entry of category information from the category DB 44, or adds a new entry of category information to the category DB 44. The response processing unit 22 edits or deletes an existing Q&A information item, or adds a new Q&A information item to the Q&A DB 45. In the present specification and claims, "alteration, addition, or deletion" of information is also referred to as "editing" of information.

Further, the response processing unit 22 displays, for example, statistics of users' feedback on the display unit 3d in accordance with a command input from an administrator or the like. The user's feedback indicates the user's evaluation with respect to an answer provided by the server 1 in response to a user's question. For example, when the user-side control unit 10 of the server 1 presents an answer to a user's question, the user-side control unit 10 asks the user whether or not the question can be solved by the answer, by performing an interaction with the user. That is, the user-side control unit 10 asks the user whether or not the answer satisfies the user. As the statistics of feedback, for example, the response processing unit 22 presents a degree of satisfaction with an answer to a question. The statistics of feedback (may also be referred to as "feedback statistics") is an example of an evaluation result.

Figure 13A:
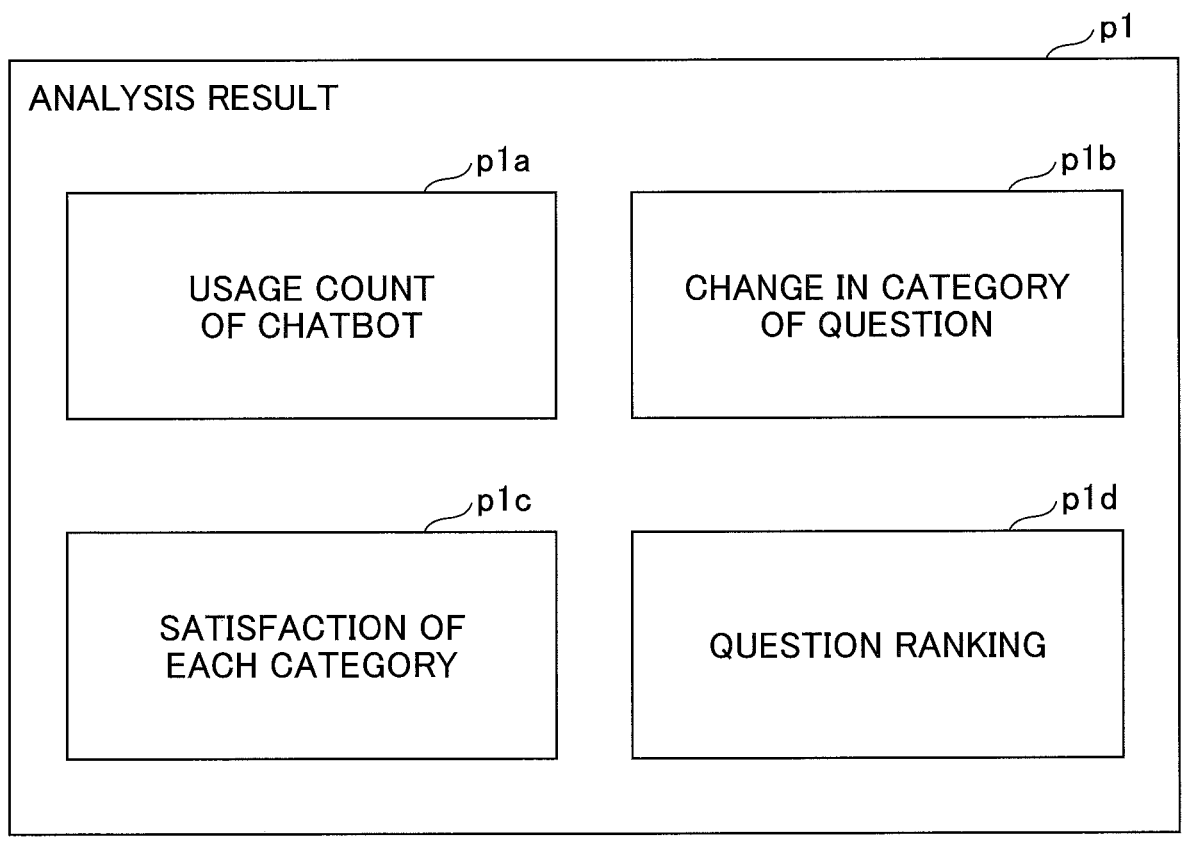
Figure 13B:
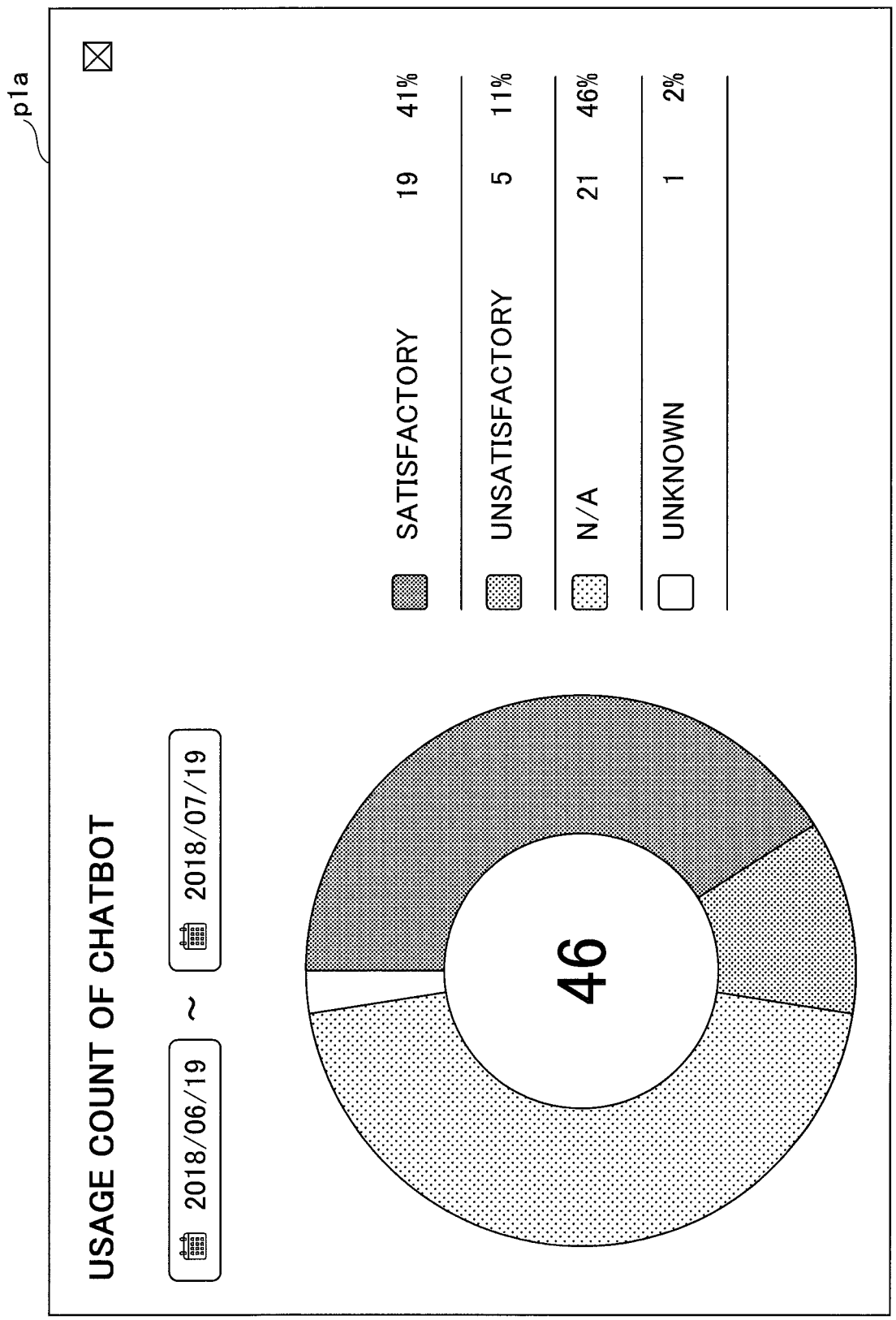

For example, FIGS. 13A to 13E are diagrams illustrating examples of screens displaying feedback statistics presented by the response processing unit 22 according to the first embodiment. The response processing unit 22 calculates multiple types of feedback statistics using the inquiry history information in the inquiry history DB 46. For example, as illustrated in FIG. 13A, the response processing unit 22 calculates four feedback statistics and displays a screen of an analysis result p1, which schematically illustrates the four feedback statistics p1a to p1d, on the display unit 3d. When any one of the feedback statistics p1a to p1d is selected by an administrator or the like, the response processing unit 22 displays a screen of details of the selected feedback statistics on the display unit 3d, as illustrated in FIGS. 13B to 13E.

Figure 13D:
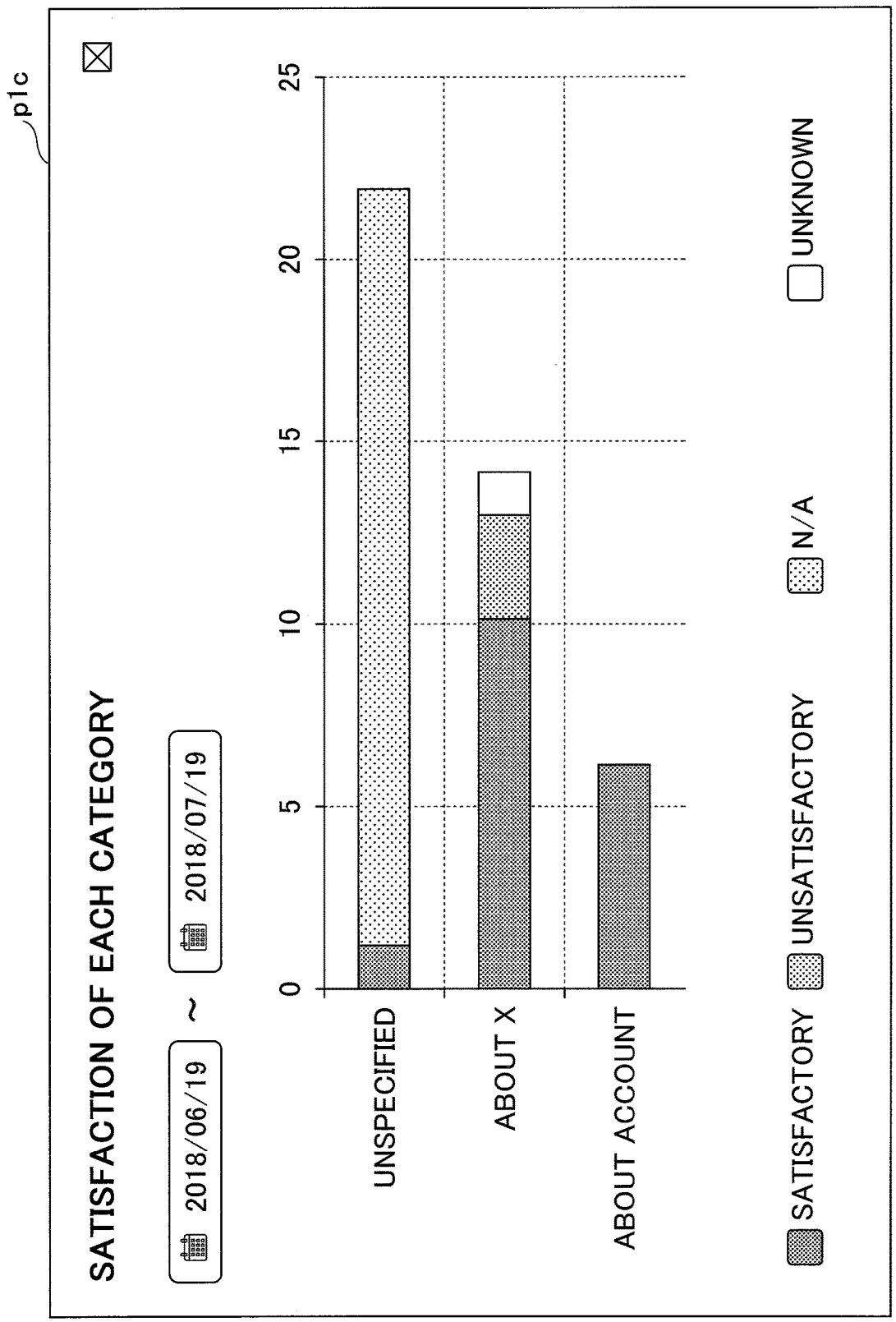

Specifically, FIGS. 13B to 13E illustrate statistics aggregated over a specified period of time. Chatbot usage count illustrated in FIG. 13B indicates the number of questions for each user evaluation level and a ratio of the number of questions for each user evaluation level to the total number of questions. Change in category of question illustrated in FIG. 13C indicates changes in the number of questions in each category. Satisfaction of each category illustrated in FIG. 13D illustrates a stacked bar chart. Each bar indicates the number of questions belonging to a certain category, and each segment ih a bar indicates the number of questions corresponding to the same user evaluation level. The question ranking in FIG. 13E illustrates rankings of questions arranged in a descending order of the number of questions, and a degree of satisfaction of each question is also presented. Types of feedback statistics are not limited to the feedback statistics p1a to p1d described here.

The processed content acquisition unit 23 acquires and stores information processed and output by the response processing unit 22. For example, after information to be stored to a certain DB is processed by the response processing unit 22, the processed content acquisition unit 23 stores the information into the DB.

<Operation of Server 1>

Figure 14:
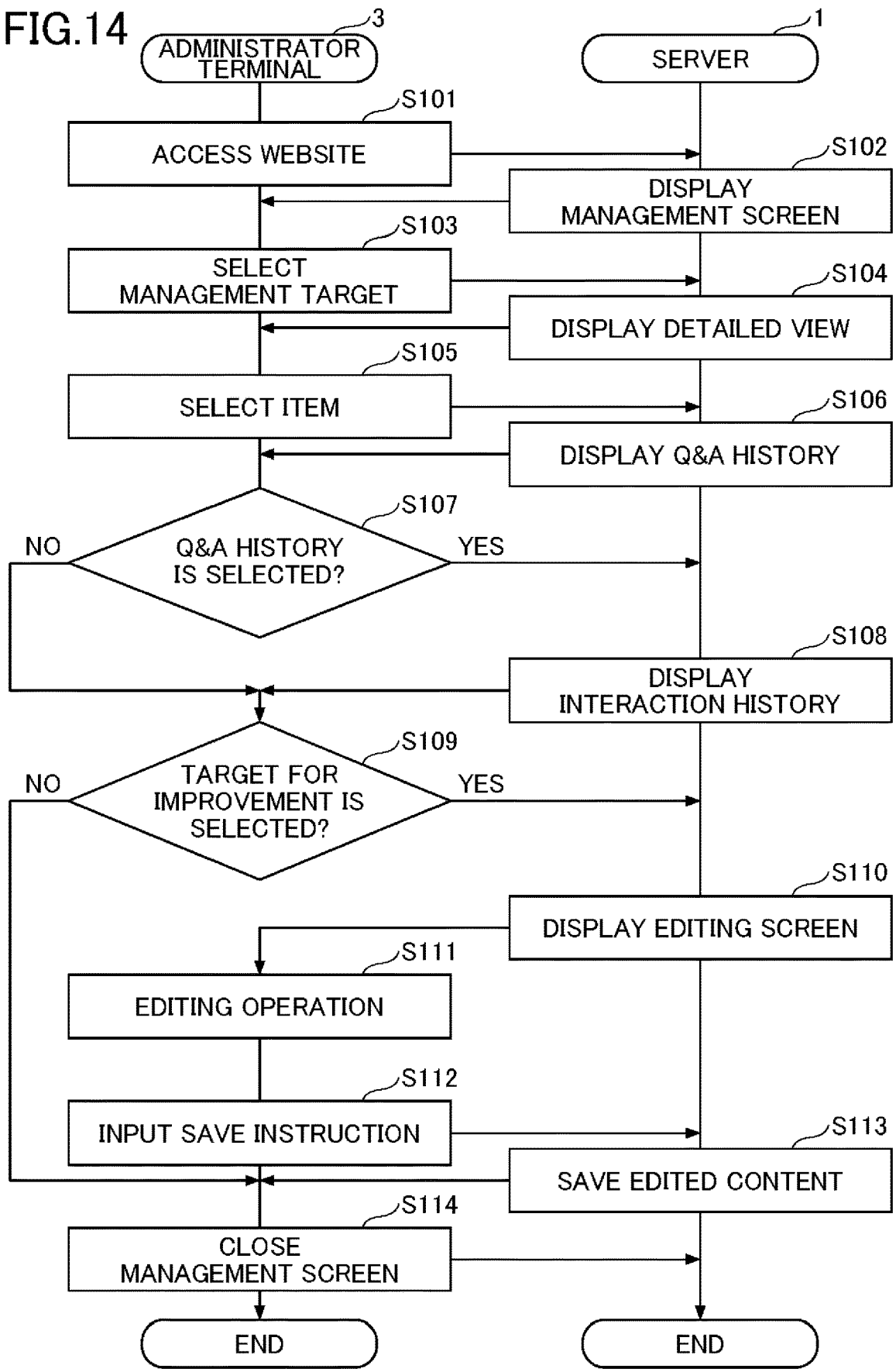
FIG. 14 is a sequence diagram illustrating an example of an operation of the server and the administrator terminal according to the first embodiment.

The operation of the server 1 will be described. Specifically, a process performed when the administrator-side control unit 20 changes information stored in each DB will be described. FIG. 14 is a sequence diagram illustrating an example of an operation of the server 1 and the administrator terminal 3 according to the first embodiment. In FIG. 14, the administrator terminal 3 is a computing device, and the management application is used via a web browser.

As illustrated in FIG. 14, first, at step S101, an administrator of the chatbot service accesses a website offering the chatbot service, by using the web browser displayed on the display unit 3d by the administrator terminal 3. In addition, the administrator logs in to the website as a chatbot service administrator. The administrator then inputs, on a webpage displayed after login, a request to display a management screen for displaying a user's feedback statistics. For example, the administrator points and clicks an item corresponding to the management screen from among displayed items.

At step S102, the server 1 causes the administrator terminal 3 to display a webpage of the management screen requested by the administrator. For example, a management screen such as the analysis result p1 in FIG. 13A is displayed on the display device 307.

When an administrator performs an input operation on the management screen for selecting a desired management target (step S103), the server 1 causes the administrator terminal 3 to display a webpage indicating details of the selected management target (step S104). The webpage of the selected management target may be displayed as a popup window, so as to be superimposed on the management screen.

For example, in the management screen, multiple management targets are displayed, such as the feedback statistics p1a to p1d of FIG. 13A. In a case in which one management target is selected from among the feedback statistics p1a to p1d, details of the selected management target are displayed at the administrator terminal 3, as illustrated in FIGS. 13B to 13E. At this time, for example, by pointing and clicking any one of the feedback statistics p1a to p1d in the analysis result p1, the administrator can transmit, to the server 1, a command for displaying the selected feedback statistics in detail. The server 1 transmits, to the administrator terminal 3, data for displaying a detailed view of the feedback statistics specified by the command, and causes the administrator terminal 3 to display the detailed view of the feedback statistics. Hereinafter, a case in which the feedback statistics p1d is selected will be described.

When the feedback statistics p1d of FIG. 13E is displayed on the webpage, the administrator inputs an operation for selecting, from a list of questions displayed on the feedback statistics p1d of FIG. 13E, one question for which the administrator wishes to check details (step S105). For example, by pointing and clicking one item of the questions, the administrator can send, to the server 1, a command for displaying detailed information of the selected question. The following description describes a case in which a question with low satisfaction "How to use easy delivery date estimator" is selected, in order to improve satisfaction of answers.

At step S106, the administrator-side control unit 20 of the server 1 causes the administrator terminal 3 to display a webpage presenting a history of the Q&A about "How to use easy delivery date estimator".

Specifically, the administrator-side control unit 20 acquires an ID of the Q&A information corresponding to the question "How to use easy delivery date estimator", by referring to the Q&A DB 45 as illustrated in FIG. 9. The administrator-side control unit 20 also searches for an ID of the inquiry history information corresponding to the ID of the Q&A information, by referring to the inquiry history DB 46 as illustrated in FIG. 10. The administrator-side control unit 20 also acquires an interaction session ID, a category ID, user input information, user feedback information, and date and time when the question was input, which correspond to the searched ID of the inquiry history information (in a case in which multiple IDs of the inquiry history information are detected, acquisition of an interaction session ID, a category ID, user input information, user feedback information, and date and time are performed for each of the IDs). Further, by referring to the interaction history DB 47 as illustrated in FIG. 11, the administrator-side control unit 20 specifies a row (or rows) corresponding to the acquired interaction session ID(s). Among the specified row(s), the administrator-side control unit 20 selects a row (or rows) having a statement type of "Q&A information" (i.e. a row (or rows) having a statement type ID "5-1"), and extracts a content ID from the selected row(s). Question(s) contained in the Q&A information corresponding to the extracted content ID are used for a server response that will be described below.

The administrator-side control unit 20 causes the administrator terminal 3 to display a Q&A history screen presenting a Q&A history for each ID of the inquiry history information, by using the acquired information. For example, FIG. 15 is a diagram illustrating an example of the Q&A history screen displayed by the administrator-side control unit 20 according to the first embodiment. As illustrated in FIG. 15, the Q&A history screen p2 presents a period for which the history is searched, a content of the question, and the Q&A history for each ID of the inquiry history information. The Q&A history includes a period when interaction with respect to the Q&A history is performed, an ID of the Q&A history, a category of a question, a question entered by a user, a server response, and advisability of the server response. In FIG. 15, Q&A histories for the two interaction sessions are presented. The Q&A history screen p2 is an example of a first screen.

The ID of the Q&A history may be the same as the ID of the inquiry history information. The server response is a pre-set question corresponding to a question entered by a user, and is a question of the Q&A information stored in the Q&A DB 45. The advisability of the server response indicates whether or not an answer in the Q&A information corresponding to the server response was appropriate. For example, if a response is received from a user after an answer is presented, the answer may be considered to be appropriate ("Y" is stored in a column of "ADVISABILITY"). If no response is received from the user, the response may be considered inappropriate ("N" is stored in the column of "ADVISABILITY").

Then, when the administrator selects one of the two Q&A histories on the Q&A history screen p2 (Yes at step S107), the administrator-side control unit 20 causes the administrator terminal 3 to display an interaction history of the selected Q&A history (step S108). Then, the process proceeds to step S109.

For example, the administrator may point and click anywhere in the Q&A history. By performing a point and click operation, the interaction session ID corresponding to the Q&A history and an instruction for displaying the interaction history corresponding to the interaction session ID are transmitted to the server 1. The administrator-side control unit 20 searches the interaction history DB 47 for the interaction history information ID corresponding to the interaction session ID, reproduces a dialog screen presenting interaction between the server 1 and the user, by using interaction history information corresponding to the retrieved interaction history information ID, and causes the administrator terminal 3 to display the dialog screen as an interaction history.

Figure 16:
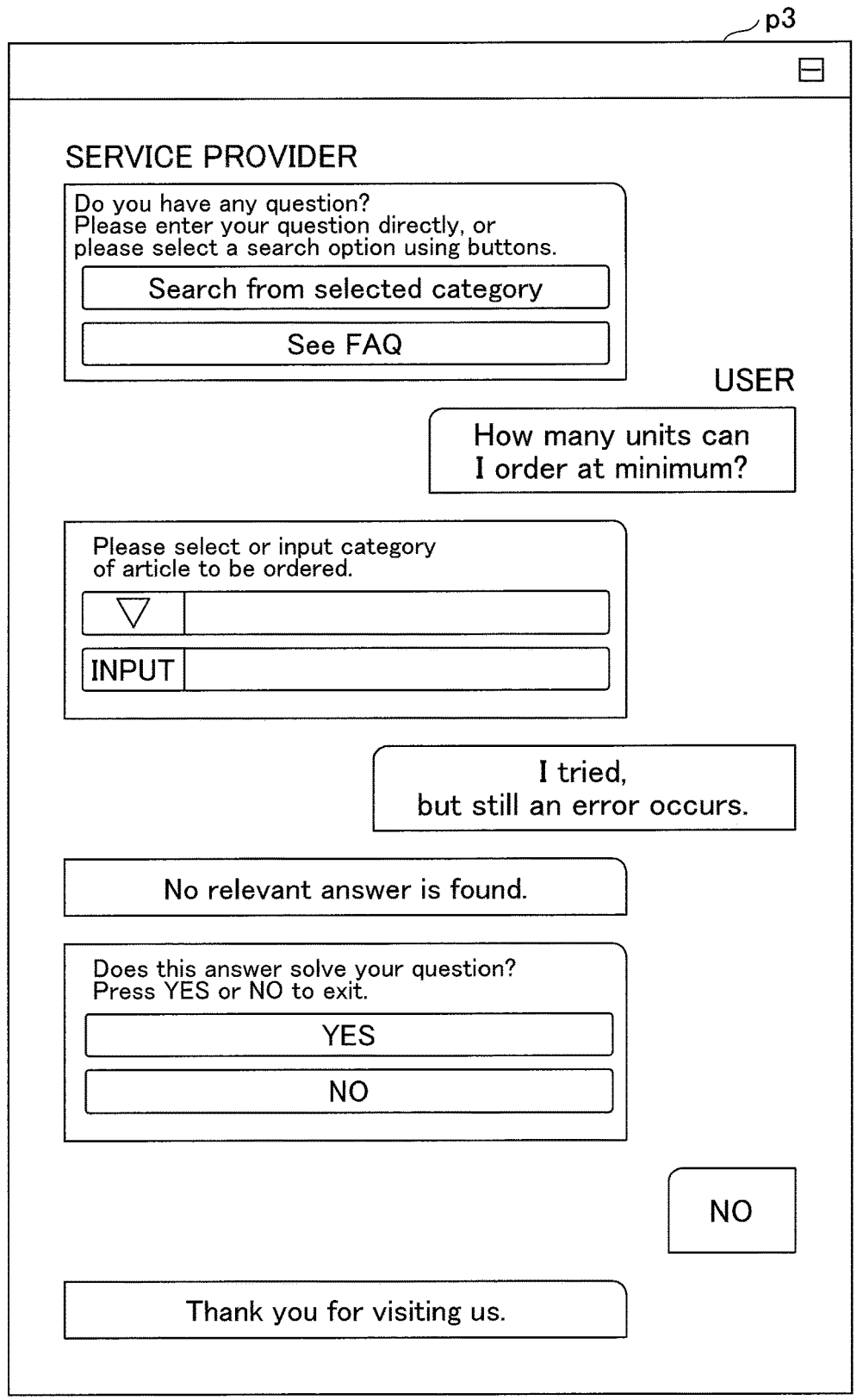
FIG. 16 is a diagram illustrating an example of a dialog screen reproduced by the administrator-side control unit according to the first embodiment.

FIG. 16 is a diagram illustrating an example of a dialog screen reproduced by the administrator-side control unit 20 according to the first embodiment. The dialog screen p3 of FIG. 16 is a chat-type screen, and illustrates all statements stated by the user and the server 1 in an interaction session corresponding the interaction session ID. The dialog screen p3 of FIG. 16 includes one interaction session. By seeing the dialog screen p3, the administrator can check a flow of the interaction and the like. Thus, it is easy for an administrator to find an inappropriate answer in a dialog if the dialog fails to solve the user's question. That is, the administrator can view the interaction history in the dialog screen p3, find an item to be corrected, and edit it as described below. Here, the dialog screen p3 is an example of a third screen.

In addition, if the administrator does not select the Q&A history in the Q&A history screen p2 (No at step S107), the process proceeds to step S109.

At step S109, when the administrator selects the item to be corrected, such as a target for improvement (Yes at step S109), the administrator-side control unit 20 causes the administrator terminal 3 to display a screen for editing the selected item.

If the determination at step S107 is negative ("No" at step S107), for example, the administrator selects, at step S109, the server response p2a on the Q&A history screen p2, as an item to be corrected, by pointing and clicking the server response p2a, and inputs an editing command. Accordingly, the administrator terminal 3 transmits the Q&A information ID corresponding to the server response p2a and the editing command thereof to the server 1.

The administrator-side control unit 20 acquires the Q&A information corresponding to the Q&A information ID, by referring to the Q&A DB 45. At step S110, the administrator-side control unit 20 causes the administrator terminal 3 to display a screen for editing the Q&A information.

For example, at step S109 following step S108, the administrator selects a statement of the server 1 as an item to be corrected, by pointing and clicking the statement on the dialog screen p3, and the administrator inputs an editing command. Accordingly, the administrator terminal 3 transmits an interaction history information ID of the statement and the editing command thereof to the server 1.

The administrator-side control unit 20 acquires a statement type ID and a content ID corresponding to the interaction history information ID, by referring to the interaction history DB 47. Also, based on the statement type ID and the content ID, the administrator-side control unit 20 detects an ID of scenario information (scenario ID) to be edited, a category information ID, or a Q&A information ID, and displays a screen for editing the detected information on the administrator terminal 3 (step S110). A set of the statement type ID and the content ID are associated with the scenario information ID, the category information ID, or the Q&A information ID in advance. For example, FIG. 17 is a diagram illustrating an example of an editing screen of the Q&A information displayed by the administrator-side control unit 20 according to the first embodiment. The editing screen p4 of FIG. 17 is a screen for editing the Q&A information. Here, the editing screen p4 is an example of a second screen.

If, at step S109, the administrator does not select an item to be corrected, such as a target for improvement (No at step S109), the process proceeds to step S114.

At step S111, the administrator performs an input operation to the editing screen p4 to edit the item, and at step S112, the administrator performs an operation to the editing screen p4 for saving edited contents. By these operations being performed, the administrator terminal 3 associates editing information that is the edited contents with a current time (which corresponds to a saved time of the editing information), and transmits the editing information associated with the saved time to the server 1.

Then, the administrator-side control unit 20 updates information in the dialog scenario DB 43, the category DB 44, and the Q&A DB 45, in which information before editing is stored, by replacing the information with the editing information. In addition, the updated date and time of the information is also updated by replacing with the saved time of the editing information. That is, at step S113, the administrator-side control unit 20 stores a result of editing.

When editing of all information is completed, the administrator closes the management screen (step S114).

At step S109, in response to the administrator's selection of the server response or the statement of the server 1, the administrator-side control unit 20 edits the scenario information, the category information, or the Q&A information, but the administrator-side control unit 20 may have a function to edit a keyword and/or a synonym. For example, if accuracy of a server response estimated from a character string of a question entered by the user is low, it is difficult to present an answer that solves the question. In such a case, by editing a keyword and/or a synonym, accuracy of the estimation can be improved.

For example, an icon for selecting an editing operation of a keyword and/or a synonym may be displayed on the Q&A history screen p2 and the dialog screen p3. At step S109, if the administrator points and clicks the icon displayed on the Q&A history screen p2 or the dialog screen p3, the administrator terminal 3 transmits an editing command of a keyword or a synonym to the server 1. Then, at step S110, the administrator-side control unit 20 causes the administrator terminal 3 to display a screen for editing a keyword or a synonym (step S110). FIG. 18 is a diagram illustrating an example of the editing screen of a synonym displayed by the administrator-side control unit 20 according to the first embodiment. The editing screen p5 illustrated in FIG. 18 is a screen for editing synonym(s) of a keyword. Here, the editing screen p5 is an example of a fourth screen.

Also, for example, phrases "search from selected category" and "see FAQ" included in the first statements illustrated in the dialog screen p3 of FIG. 16 relate to a scenario. If the administrator points and clicks the statement displayed on the dialog screen p3 at step S109, the administrator terminal 3 transmits a command for editing the scenario to the server 1. Then, at step S110, the administrator-side control unit 20 causes the administrator terminal 3 to display the editing screen (not illustrated) for editing the scenario. Here, the editing screen for editing a scenario is an example of a fifth screen.

Figure 19:
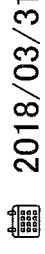
FIG. 19 is a diagram illustrating an example of a display screen of the feedback statistics represented by the response processing unit according to the first embodiment.
Figure 21A:
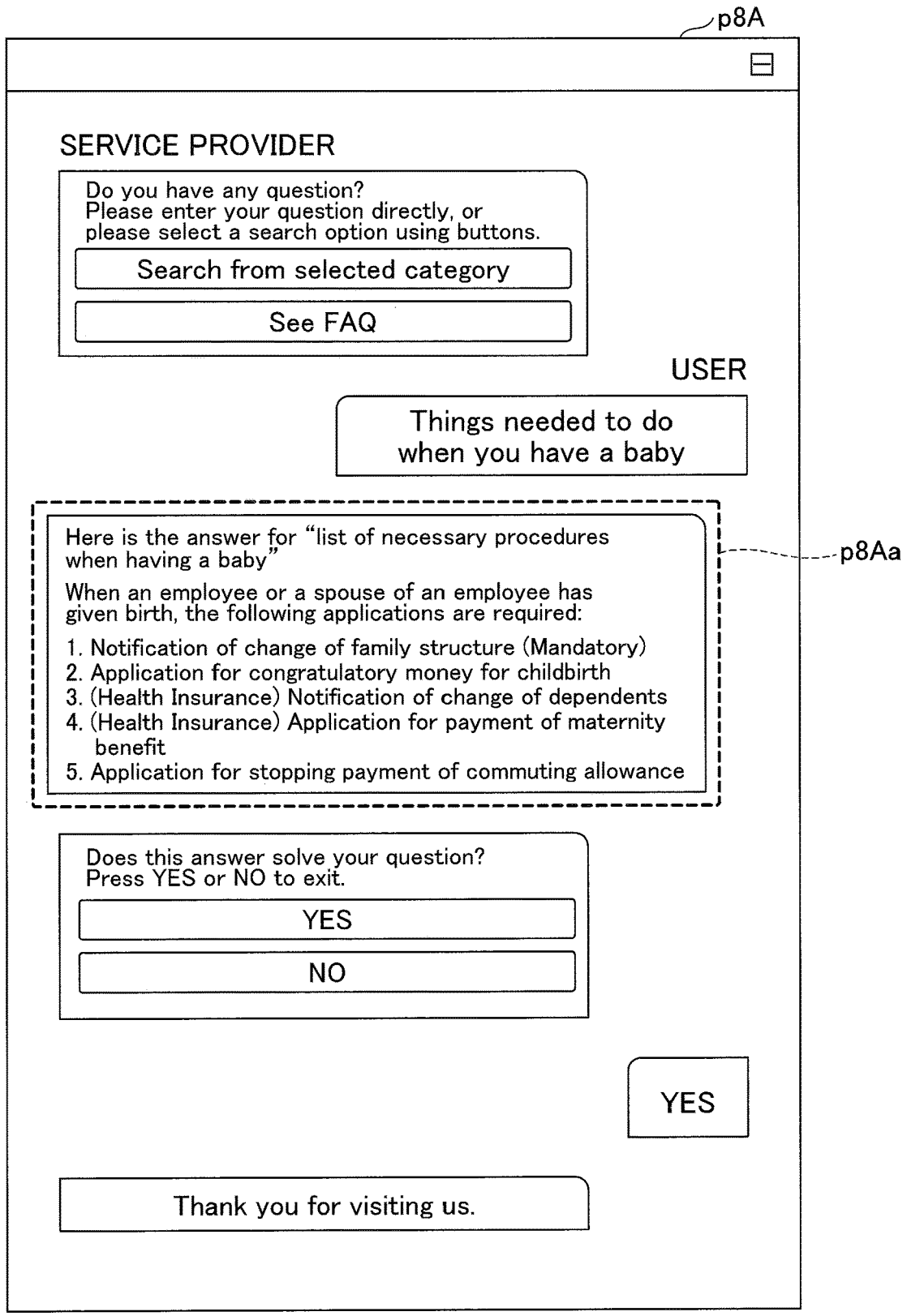
FIG. 21A is a diagram illustrating an example of the dialog screen reproduced by the management-side control unit according to the first embodiment.

In the above description, a case in which an interaction session displayed on the dialog screen p3 includes one dialog group, consisting of interactions starting from an input of a question by a user to an input of feedback by the user in response to an answer to the question being presented, is described. However, an interaction session may include more than one dialog group. An example in which an interaction session containing two dialog groups is displayed will be described, with reference to FIGS. 19 to 23. FIG. 19 is a diagram illustrating an example of a screen of feedback statistics presented by the response processing unit 22 according to the first embodiment. FIG. 20 is a diagram illustrating an example of the Q&A history screen displayed by the administrator-side control unit 20 according to the first embodiment. FIGS. 21A and 21B are diagrams each illustrating an example of a dialog screen reproduced by the administrator-side control unit 20 according to the first embodiment. FIG. 22 is a diagram illustrating an example of the editing screen of the Q&A information displayed by the administrator-side control unit 20 according to the first embodiment. FIG. 23 is a diagram illustrating an example of information after being edited that is stored in the Q&A DB 45 according to the first embodiment.

On the screen of the administrator terminal 3 on which the feedback statistics p6 illustrated in FIG. 19 is displayed, when the administrator selects an item of the question "3. Congratulatory money for childbirth", the administrator-side control unit 20 of the server 1 causes the administrator terminal 3 to display the Q&A history screen p7 with respect to the question "3. Congratulatory money for childbirth". The Q&A history screen p7 of FIG. 20 illustrates multiple Q&A histories included in one interaction session. IDs of the two Q&A history information items are each "3-2" and "3-3", and the interaction session IDs of the two Q&A history information items are the same. IDs of the interaction history information items included in the Q&A history are "4-1" and "4-14" as illustrated in FIG. 11, and interaction session IDs of these interaction history information items are the same.

For example, when the administrator selects a server response p7a on the Q&A history screen p7, the administrator-side control unit 20 causes the administrator terminal 3 to display, based on the interaction session ID, the dialog screens p8A and p8B constituting one interaction session, as illustrated in FIGS. 21A and 21B. Advisability of the server response p7a is "N". Note that, even when any of the three server responses in the Q&A history screen p7 is selected, the dialog screens p8A and p8B are displayed.

For example, if only the dialog screen p8B is displayed, it is difficult for the administrator to infer why the statement p8Ba could not solve a user's question. However, if the dialog screens p8A and p8B are displayed, the administrator can easily infer intent of the question based on context of interaction between a user and the server 1. By referring to the dialog screen p8A, the administrator can infer that the user is asking about application for congratulatory money for childbirth. Thus, the administrator can understand that the statement p8Aa illustrated in the dialog screen p8A may be edited.

When the administrator selects the statement p8Aa, the administrator-side control unit 20 detects, from the Q&A DB 45, the Q&A information including the statement p8Aa as an answer, and causes the administrator terminal 3 to display the editing screen p9 of the Q&A information on which this information is displayed as illustrated in FIG. 22. When the administrator performs editing on the editing screen p9 and performs an operation for saving the edited information, the administrator-side control unit 20 updates the Q&A information in the Q&A DB 45 with new (updated) Q&A information. For example, a content of the answer of ID "1-11" in the Q&A information of FIG. 9 is updated with the update date and time as illustrated in FIG. 23. Even if scenario information, category information, a keyword, or a synonym is required to be edited, by displaying two or more dialog groups of an interaction session, it may become easier to detect an item to be edited. That is, by setting the delimitation of the interaction session to include two or more dialog groups, detection of an item to be edited becomes easier.

The administrator-side control unit 20 may reflect the updated information in the feedback statistics. For example, if an updated date and time of the scenario information, the category information, the Q&A information, the keyword, or the synonym is included in a target period of feedback statistics to be displayed on the display unit 3d of the administrator terminal 3, the administrator-side control unit 20 may display a switch button on the display screen. An example of the switch button includes a toggle button and a slide button.

When the administrator switches the switch button, the administrator-side control unit 20 may cause the administrator terminal 3 to switch feedback statistics to be displayed, between feedback statistics aggregated during an entire target period and feedback statistics aggregated during a period after the updated date and time among a target period. Further, the administrator-side control unit 20 may explicitly indicate, in the displayed feedback statistics, that information has been updated during a target period.

<Effects>

The above-described server 1 according to the first embodiment communicates with the user terminal 2 serving as a first terminal device, to transmit message information in response to received message information. The server 1 includes the Q&A DB 45 serving as the information storage unit, the inquiry history DB 46 and the interaction history DB 47 serving as the history storage unit, and the administrator-side control unit 20 serving as the modification unit. The information storage unit stores reference information including at least one set of a question item and a response corresponding to the question item, which is referenced when the server 1 replies. The history storage unit stores history information that is a history of inquiries received from the first terminal device and messages that are transmitted or received with respect to the received inquiries. The modification unit updates the reference information stored in the Q&A DB 45 using the history information. The administrator-side control unit 20 causes a first screen including the history information to be displayed, receives an operation of selecting an item corresponding to change target information, from among the history information displayed on the first screen, causes a second screen for updating the reference information corresponding to the selected item to be displayed, and receives update of the reference information corresponding to the selected item through the second screen.

According to the above-described configuration, when the reference information is updated, the server 1 performs steps of: causing an item to be selected from the history information displayed on the first screen; and causing the reference information, corresponding to the selected item, to be updated through the second screen. That is, by performing the two steps, the reference information to be changed is updated. Therefore, editing of registered information is simplified.

The server 1 according to the first embodiment may further include a communication unit 31. The communication unit 31 may function as a transmission unit that transmits, to the administrator terminal 3 serving as a second terminal device, first screen information for displaying the first screen and second screen information for displaying the second screen, and may function as a reception unit that receives information indicating the change target information selected through the first screen displayed on the administrator terminal 3, and receives information indicating change of the reference information instructed through the second screen displayed on the administrator terminal 3, from the administrator terminal 3. The administrator-side control unit 20 may receive the information indicating the change target information and the information indicating the change of the reference information, which are received by the communication unit 31. According to the above-described configuration, the administrator can view the history information, select the change target information from the history information, and change the reference information corresponding to the selected change target information, by using the administrator terminal 3 other than the server 1 or the user terminal 2.

Further, in the server 1 according to the first embodiment, the history information may include inquiry history information, which is a history of the received inquiry information and the response information returned in response to the inquiry information, and message history information, which is a history of a message that is sent or received with respect to the inquiry information. The administrator-side control unit 20 may cause the first screen including the inquiry history information to be displayed, may receive, through the first screen, a selection operation from among the inquiry history information items displayed on the first screen, may cause the third screen including the message history information corresponding to the selected inquiry history information item to be displayed, may receive, through the third screen, selection of change target information from among the message history information displayed on the third screen, and may cause the second screen for changing the reference information corresponding to the selected information to be displayed.

According to the configuration described above, when the reference information is changed, the server 1 causes the message history information to be displayed on the third screen, and causes an administrator or the like to select the change target information from among the displayed message history information. Because the administrator or the like can recognize context of interaction between the server 1 and a user based on the message history information, the administrator or the like can modify the reference information so that a more accurate answer can be presented in response to query information issued by the user. Therefore, accuracy of an answer provided by the server 1 is improved.

In the server 1 according to the first embodiment, the reference information may further include information of a synonym of a character string included in the inquiry information of the reference information. The administrator-side control unit 20 may receive selection of the information of the synonym to be changed through the third screen, may cause a fourth screen for changing the information of the selected synonym to be displayed, may receive change of the information of the synonym through the fourth screen, and may update the information of the synonym stored in the synonym DB 42.

According to the above-described configuration, when it is necessary to associate query information provided from a user with the query information in the Q&A DB 45, the server 1 can perform the association based on the information of the synonym. Because the information of the synonym can be changed, accuracy of the association can be improved.

In the server 1 according to the first embodiment, the reference information may further include scenario information representing a scenario for outputting the response in response to the inquiry information. The administrator-side control unit 20 may receive selection of the scenario information to be changed through the third screen, may cause a fifth screen for changing the selected scenario information to be displayed, may receive change of the selected scenario information through the fifth screen, and may change the scenario information stored in the dialog scenario DB 43.

According to the above-described configuration, the server 1 can smoothly interact with a user by following the scenario information. Because the scenario information can be changed, accuracy of scenario information can be improved.

The server 1 according to the first embodiment may include a user-side control unit 10 as an evaluation reception unit that receives evaluation of the response transmitted in response to the received inquiry information, and the administrator-side control unit 20 as an evaluation display unit that displays a screen including a result of the evaluation received by the user-side control unit 10. In response to selection of the result of the evaluation displayed on the screen, the administrator-side control unit 20 may cause the second screen for updating the reference information corresponding to the result of the evaluation to be displayed, and may receive update of the reference information corresponding to the result of the evaluation through the second screen.

According to the above configuration, the administrator or the like can view the result of the evaluation of the response, and change the reference information based on the result of the evaluation. This simplifies selection of reference information to be changed.

In the server 1 according to the first embodiment, the administrator-side control unit 20 may display a screen including the result of the evaluation before the change of the reference information and/or after the change of the reference information. According to the above-described configuration, because the administrator or the like can check the result of the evaluation before and after the change of the reference information, the administrator or the like can judge whether the change of the reference information is appropriate or not. Therefore, it is possible to improve accuracy of the reference information.

Second Embodiment

A server 1A according to a second embodiment causes the user terminal 2 to display a selection menu for selecting a search method from methods including "search from recommended questions", when interacting with a user through the user terminal 2. Hereinafter, the second embodiment will be described mainly with respect to points different from the first embodiment, and the same points as those in the first embodiment will be appropriately omitted.

Figure 24:
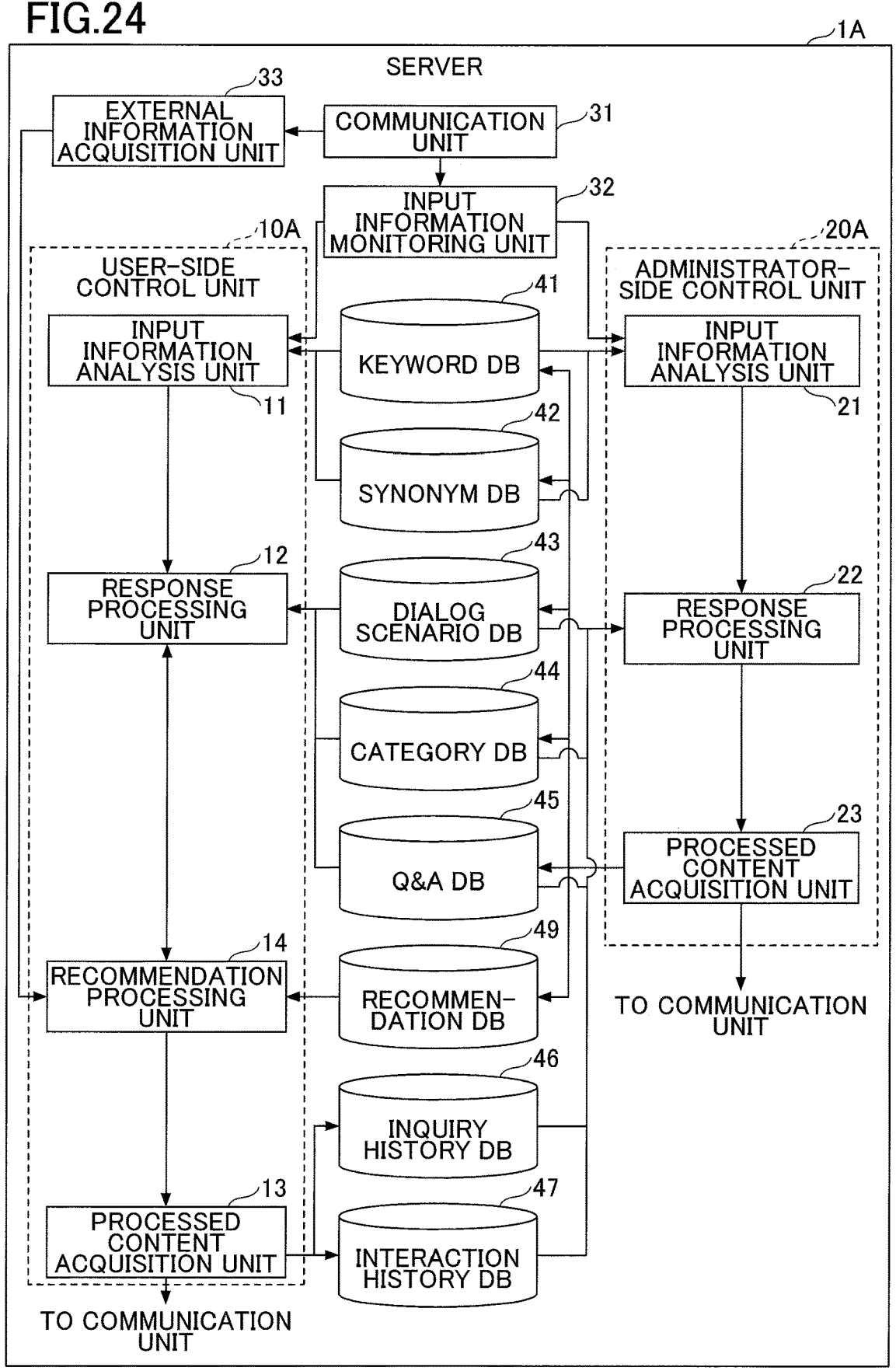
FIG. 24 is a diagram illustrating an example of a functional configuration of a server according to a second embodiment.

FIG. 24 is a diagram illustrating an example of a functional configuration of the server 1A according to the second embodiment. As illustrated in FIG. 24, the server 1A includes a communication unit 31, an input information monitoring unit 32, an external information acquisition unit 33, a user-side control unit 10A, and an administrator-side control unit 20A. The server 1A further includes, as a DB, a recommendation DB 49 in addition to DBs in the server 1 according to the first embodiment. The user-side control unit 10A further includes a recommendation processing unit 14, in addition to the functional components included in the user-side control unit 10 according to the first embodiment.

The external information acquisition unit 33 acquires information from an external apparatus of the server 1 through the communication unit 31 and the communication network 4, and outputs the information to the recommendation processing unit 14. The external apparatus may be one or more devices (apparatuses). For example, the external apparatus may be servers in various information providers. The servers in the various information providers provide information related to a season, a year, a month, a day, time, day of a week, weather, events, new product release time, news, and other various types of information related to time.

The recommendation DB 49 stores various keywords related to time, in association with the time. For example, keywords such as "spring", "cherry blossom", "hanami", "entrance into school", "transfer", and "move" are stored in the recommendation DB 49, in association with "April", a term expressing season. For example, keywords such as "difference from old products", "new function", and "release date" are stored in association with the term "release of new product".

By matching a character string of information acquired from the external information acquisition unit 33 with respect to the recommendation DB 49, the recommendation processing unit 14 extracts, from the information, a keyword related to time. The recommendation processing unit 14 also extracts, from the Q&A DB 45, the Q&A information including the extracted keyword, and outputs the extracted Q&A information to the response processing unit 12.

The response processing unit 12 has a function similar to the response processing unit 12 according to the first embodiment, but scenario information used by the response processing unit 12 according to the second embodiment is different from that of the first embodiment. In the scenario information illustrated in FIG. 7, the selection menu displayed at step S31 includes three choices: "Search from all categories", "Search from selected category", and "Search from FAQ". In the present embodiment, the selection menu includes four choices: "Search from all categories", "Search from selected category", "Search from FAQ", and "Search from recommended questions". Further, in FIG. 7, the number of steps branching from step S31 is three: step S32, step S37, and step S39. However, in the present embodiment, step S31 branches into step S32, step S37, step S39, and a step of prompting to make a selection from one or more recommended questions or to select another search option.

Accordingly, in a case in which "Search from recommended question" is selected at step S31, the response processing unit 12 causes the user terminal 2 to display one or more recommended questions acquired from the recommendation processing unit 14 and a message requesting selection of another search method. Processes to be performed after this displaying step are the same as those performed in a case in which "Search from FAQ" is selected. This allows a user to quickly find a question of interest when searching for a question related to time, by selecting "Search from recommended questions".

The administrator-side control unit 20A has the same function as the administrator-side control unit 20 according to the first embodiment. According to the present embodiment, when communicating with an administrator through the administrator terminal 3, the administrator-side control unit 20A edits information in the recommendation DB 49 by using history information.

As the other configurations and operations of the server 1A according to the second embodiment are similar to those of the first embodiment, the descriptions thereof are omitted. Also, according to the above-described server 1A in the second embodiment, the same effect as the first embodiment can be obtained. Further, in an interaction with a user via the user terminal 2, the server 1A according to the second embodiment presents a recommended question when a user searches for a question. Because such a recommended question may be set according to the time when a question is asked, it is easy and expeditious for the user to retrieve the questions.

Other Embodiments

Although examples of embodiments of the present invention have been described, the present invention is not limited to the above-described embodiments or their alternatives. That is, various modifications and enhancements are possible within the scope of the present invention. For example, variations of the embodiments or alternatives, and an embodiment configured by combining components in different embodiments or alternatives, are also within the scope of the present invention.

For example, the server according to the above-described embodiment includes a database (such as DBs 41 to 47), but the database may be provided separately from the server. In this case, the server and the database may be coupled with each other via wired or wireless communication, and the server may retrieve or update contents in the database via wired or wireless communication. For example, the server may be coupled with the database via the communication network 4.

The user-side control unit and the administrator-side control unit according to the above-described embodiment are included in a single server, but may be included in two or more servers. In this case, the database may also be provided separately from the server, and each of the two or more servers may communicate with the database.

Further, in the server according to the embodiment, each database (DB) stores character string information, but is not limited thereto. The database may store information such as image information or audio information.

Also, one embodiment of the present invention may be an information processing method. For example, an information processing method according to the embodiment of the present invention is an information processing method performed by an apparatus communicating with a first terminal device and transmitting message information responsive to received message information. The information processing method includes: obtaining reference information referenced upon response; acquiring history information which is a history of response information that is transmitted or received with respect to received query information; and modifying the reference information using the history information. The reference information includes the inquiry information and response information corresponding to the inquiry information. The step of modifying the reference information includes a step of causing the second terminal device to display a first screen including the history information, a step of receiving, from the second terminal device through the first screen, selection of change target information which is information to be changed, from among the history information displayed on the first screen, a step of causing the second terminal device to display a second screen for modifying the reference information corresponding to the selected change target information, and a step of receiving change of the reference information from the second terminal device via the second screen. According to this information processing method, the same effect as the above-described information processing apparatus is obtained. Such an information processing method may be implemented by circuitry such as CPU or LSI, an IC card, an individual module, or the like.

One embodiment of the present invention may also be a program (computer program), or a non-transitory computer-readable recording medium storing the program. It will be appreciated that the program can be distributed via a transmission medium such as the Internet. For example, a program according to the present invention is a program for communicating with a first terminal and having a computer transmit message information responsive to received message information, for acquiring reference information referenced upon response, for acquiring history information which is a history of the sent/received response information with respect to received query information, and for modifying the reference information using the history information, for changing the reference information including inquiry information and response information corresponding to the query information, for outputting information for displaying a first screen including the historical information, for receiving from among the historical information displayed on the first screen a selection of the information to be changed through the first screen, for displaying a second screen for changing the reference information corresponding to the selected target information, and for receiving a change of the reference information via the second screen. This program has the same effect as the above-described information processing apparatus.

The ordinal numbers, quantities, and the like used above are all exemplary for the purpose of illustrating the technology of the present invention, and the present invention is not limited to the exemplary numbers. The connection relationship between the components is also exemplified for the purpose of illustrating the technology of the present invention, and the connection relationship that achieves functions of the present invention is not limited thereto.

Also, in the functional block diagrams, the division of blocks is an example, and multiple blocks may be embodied as a single block, a block may be divided into multiple blocks, and/or some functions may be transferred to another block. The functions of blocks each having similar functions may also be performed, in parallel or in a time sharing manner, by single hardware or software.

What is claimed is:

1. An information processing apparatus configured to communicate with a first terminal device, and to transmit a message in response to receiving an inquiry; the information processing apparatus comprising:
    a hardware processor; and
    a hardware memory storing a computer program that causes the hardware processor to execute a process in response to receiving an inquiry from the first terminal device, the process including:
        retrieving reference information that includes at least one set of a question item and a response corresponding to the question item, the reference information being referenced when responding to an inquiry received from the first terminal device;
        retrieving history information that includes inquiries received from the first terminal device and messages that are transmitted or received with respect to the received inquiries; and
        updating the reference information based on the history information, the reference information being updated by
            causing a first screen, on which information in the history information is rendered, to be displayed;
            receiving, through the first screen, a selection operation of selecting an item in the history information rendered on the first screen;
            causing a third screen, on which a dialog history corresponding to the item selected through the first screen is rendered, to be displayed in a case where the selected item from the history information rendered on the first screen is a message included in the history information, wherein
                the dialog history includes multiple sets of interactions between the first terminal device and the information processing apparatus, and the interactions including one or more messages-transmitted from the information processing apparatus;
            receiving, through the third screen, an operation of selecting change target information from among the multiple sets of interactions between the first terminal device and the information processing apparatus rendered on the third screen;
            causing a second screen, through which the reference information corresponding to the change target information selected through the third screen is updated, to be displayed in response to the selection of the change target information in a case where the selected item from the history information rendered on the first screen corresponds to a session; and
            receiving, through the second screen, a reference information updating operation for updating the reference information corresponding to the selected change target information.

2. The information processing apparatus according to claim 1, wherein
    causing the first screen to be displayed comprises transmitting first screen information for displaying the first screen to a second terminal device, and causing the second terminal device to display the first screen;
    causing the third screen to be displayed comprises transmitting third screen information for displaying the third screen to the second terminal device, and causing the second terminal device to display the third screen;
    causing the second screen to be displayed comprises transmitting second screen information for displaying the second screen to the second terminal device and causing the second terminal device to display the second screen;
    the receiving of the operation of selecting the change target information comprises receiving, from the second terminal device, information indicating the change target information selected through the third screen displayed on the second terminal device; and
    the receiving of the reference information updating operation for updating the reference information corresponding to the selected change target information comprises receiving the reference information updating operation through the second screen of the second terminal device.

3. The information processing apparatus according to claim 1, wherein
    the reference information includes information of a synonym of a character string included in the question item in the reference information; and
    the process further includes
        receiving, through the third screen, an instruction to update the synonym,
        causing a fourth screen for updating the synonym to be displayed,
        receiving, through the fourth screen, information of an updated synonym of the synonym, and
        updating the information of the synonym in the reference information, with the updated synonym.

4. The information processing apparatus according to claim 1, wherein
    the reference information further includes scenario information representing a scenario for outputting the response in response to the received inquiry; and
    the process further includes receiving selection of the scenario information to be updated through the third screen,
causing a fifth screen for updating the selected scenario information to be displayed,
receiving an update operation of the selected scenario information through the fifth screen, and
updating the scenario information in the reference information.

5. The information processing apparatus according to claim 1, the process further including:
receiving evaluation of the response transmitted in response to the received inquiry;
causing a sixth screen, on which a result of the evaluation received is rendered, to be displayed; and
receiving a selection of the result of the evaluation rendered on the sixth screen; wherein
on the second screen, the reference information corresponding to the result of the evaluation is displayed, in response to receiving the selection of the result of the evaluation.

6. The information processing apparatus according to claim 5, wherein, on the sixth screen, the result of the evaluation before the update of the reference information and after the update of the reference information is rendered.

7. An information processing method performed by an information processing apparatus configured to communicate with a first terminal device, and to transmit a message in response to receiving an inquiry from the first terminal device; the method comprising:
retrieving reference information that includes at least one set of a question item and a response corresponding to the question item, the reference information being referenced when responding to an inquiry received from the first terminal device;
retrieving history information that includes inquiries received from the first terminal device and messages that are transmitted or received with respect to the received inquiries; and
updating the reference information based on the history information, the reference information being updated by
causing a first screen, on which information in the history information is rendered, to be displayed;
receiving, through the first screen, a selection operation of selecting an item in the history information rendered on the first screen;
causing a third screen, on which a dialog history corresponding to the item selected through the first screen is rendered, to be displayed in a case where the selected item from the history information rendered on the first screen is a message included in the history information, wherein
the dialog history includes multiple sets of interaction between the first terminal device and the information processing apparatus, and the interactions including one or more messages transmitted from the information processing apparatus;
receiving, through the third screen, an operation of selecting change target information from among the multiple sets of interactions between the first terminal device and the information processing apparatus rendered on the third screen;
causing a second screen, through which the reference information corresponding to the change target information selected through the third screen is updated, to be displayed in response to the selection of the change target information in a case where the selected item from the history information rendered on the first screen corresponds to a session; and
receiving a reference information updating operation for updating the reference information corresponding to the selected change target information through the second screen.

8. The information processing method according to claim 7, wherein
causing a first screen to be displayed comprises transmitting first screen information for displaying the first screen to a second terminal device, and causing the second terminal device to display the first screen;
causing a third screen to be displayed comprises transmitting third screen information for displaying the third screen to the second terminal device, and causing the second terminal device to display the third screen;
causing a second screen to be displayed comprises transmitting second screen information for displaying the second screen to the second terminal device, and causing the second terminal device to display the second screen;
the receiving of the operation of selecting the change target information comprises receiving, from the second terminal device, information indicating the change target information selected through the third screen displayed on the second terminal device; and
the receiving of the reference information updating operation for updating the reference information corresponding to the selected change target information comprises receiving the reference information updating operation through the second screen of the second terminal device.

9. The information processing method according to claim 7, wherein
the reference information includes information of a synonym of a character string included in the question item in the reference information; and
the method further comprises:
receiving, through the third screen, an instruction to update the synonym,
causing a fourth screen for updating the synonym to be displayed,
receiving, through the fourth screen, information of an updated synonym of the synonym, and
updating the information of the synonym in the reference information, with the updated synonym.

10. The information processing method according to claim 7, wherein
the reference information further includes scenario information representing a scenario for outputting the response in response to the received inquiry; and
the method further comprises:
receiving selection of the scenario information to be updated through the third screen,
causing a fifth screen for updating the selected scenario information to be displayed,
receiving an update operation of the selected scenario information through the fifth screen, and
updating the scenario information in the reference information.

11. The information processing method according to claim 7, further comprising:
receiving evaluation of the response transmitted in response to the received inquiry;
causing a sixth screen, on which a result of the evaluation received is rendered, to be displayed; and receiving a selection of the result of the evaluation rendered on the sixth screen; wherein
on the second screen, the reference information corresponding to the result of the evaluation is displayed, in response to receiving the selection of the result of the evaluation.

12. The information processing method according to claim 11, wherein, on the sixth screen, the result of the evaluation before the update of the reference information and after the update of the reference information is rendered.

13. A non-transitory computer-readable recording medium storing a computer program for a computer configured to communicate with a first terminal device, and to transmit a message in response to receiving an inquiry from the first terminal device, the stored computer program being configured to cause the computer to execute a method comprising:
retrieving reference information that includes at least one set of a question item and a response corresponding to the question item, the reference information being referenced when responding to an inquiry received from the first terminal device;
retrieving history information that includes inquiries received from the first terminal device and messages that are transmitted or received with respect to the received inquiries; and
updating the reference information based on the history information, the reference information being updated by
causing a first screen, on which information in the history information is rendered, to be displayed;
receiving, through the first screen, a selection operation of selecting an item in the history information rendered on the first screen;
causing a third screen, on which a dialog history corresponding to the item selected through the first screen is rendered, to be displayed in a case where the selected item from the history information rendered on the first screen is a message included in the history information, wherein
the dialog history includes multiple sets of interaction between the first terminal device and the information processing apparatus, and the interaction including one or more messages transmitted from the information processing apparatus;
receiving, through the third screen, an operation of selecting change target information from among the multiple sets of interaction between the first terminal device and the information processing apparatus rendered on the third screen;
causing a second screen, through which the reference information corresponding to the change target information selected through the third screen is updated, to be displayed in response to the selection of the change target information in a case where the selected item from the history information rendered on the first screen corresponds to a session; and
receiving a reference information updating operation for updating the reference information corresponding to the selected change target information through the second screen.

14. The non-transitory computer-readable recording medium according to claim 13, wherein
causing the first screen to be displayed comprises transmitting first screen information for displaying the first screen to a second terminal, and causing the second terminal device to display the first screen;
causing the third screen to be displayed comprises transmitting third screen information for displaying the third screen to the second terminal device, and causing the second terminal device to display the third screen;
causing the second screen to be displayed comprises transmitting second screen information for displaying the second screen to the second terminal device, and causing the second terminal device to display the second screen;
the receiving of the operation of selecting the change target information comprises receiving, from the second terminal device, information indicating the change target information selected through the third screen displayed on the second terminal device; and
the receiving of the reference information updating operation for updating the reference information corresponding to the selected change target information comprises receiving the reference information updating operation through the second screen of the second terminal device.

15. The non-transitory computer-readable recording medium according to claim 13, wherein
the reference information includes information of a synonym of a character string included in the question item in the reference information; and
the method further comprises:
receiving, through the third screen, an instruction to update the synonym,
causing a fourth screen for updating the synonym to be displayed,
receiving, through the fourth screen, information of an updated synonym of the synonym, and
updating the information of the synonym in the reference information, with the updated synonym.

16. The non-transitory computer-readable recording medium according to claim 13, wherein
the reference information further includes scenario information representing a scenario for outputting the response in response to the received inquiry; and
the method further comprises:
receiving selection of the scenario information to be updated through the third screen,
causing a fifth screen for updating the selected scenario information to be displayed,
receiving an update operation of the selected scenario information through the fifth screen, and
updating the scenario information in the reference information.

17. The non-transitory computer-readable recording medium according to claim 13, further comprising:
receiving evaluation of the response transmitted in response to the received inquiry;
causing a sixth screen, on which a result of the evaluation received is rendered, to be displayed; and
receiving a selection of the result of the evaluation rendered on the sixth screen; wherein
on the second screen, the reference information corresponding to the result of the evaluation is displayed, in response to receiving the selection of the result of the evaluation.

* * * * *